(12) United States Patent
Hagiwara et al.

(10) Patent No.: US 8,023,798 B2
(45) Date of Patent: Sep. 20, 2011

(54) RECORDING APPARATUS, MOBILE RECEIVER APPARATUS AND DATA MANAGEMENT METHOD

(75) Inventors: Kazuaki Hagiwara, Koganei (JP); Takashi Onoda, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1386 days.

(21) Appl. No.: 11/505,717

(22) Filed: Aug. 17, 2006

(65) Prior Publication Data
US 2007/0047906 A1 Mar. 1, 2007

(30) Foreign Application Priority Data

Aug. 29, 2005 (JP) ................................. 2005-247591
Apr. 25, 2006 (JP) ................................. 2006-120041

(51) Int. Cl.
H04N 9/80 (2006.01)
H04N 5/76 (2006.01)
H04N 5/78 (2006.01)
H04N 40/00 (2006.01)
G06F 3/00 (2006.01)
G06F 13/00 (2006.01)
H04B 1/38 (2006.01)
H04N 7/20 (2006.01)
H04N 7/18 (2006.01)
H04N 7/173 (2006.01)
H04N 5/445 (2006.01)
H04N 20/71 (2006.01)
H04N 20/74 (2006.01)
H04N 60/09 (2006.01)

(52) U.S. Cl. ........ 386/248; 386/239; 386/291; 386/314; 725/73; 725/74; 725/86; 725/55; 725/89; 725/92; 725/142; 725/145; 455/3.01; 455/3.02; 455/3.03; 455/3.04; 455/3.05; 455/3.06; 455/566.1

(58) Field of Classification Search .................... 386/68, 386/83, 98, 21, 113, 239, 248, 291, 314; 725/73, 74, 86, 55, 89, 92, 142, 145; 455/3.01–3.06, 455/556.1
See application file for complete search history.

(56) References Cited

U.S. PATENT DOCUMENTS
4,481,573 A * 11/1984 Fukunaga et al. ............ 711/207
(Continued)

FOREIGN PATENT DOCUMENTS
CN 1427553 A 7/2003
(Continued)

OTHER PUBLICATIONS
Notification Concerning Transmittal of International Search Report and Written Opinion of the International Searching Authority dated Jan. 26, 2007 for PCT/JP2006/316534, 12 sheets.
(Continued)

Primary Examiner — Thai Tran
Assistant Examiner — Daquan Zhao
(74) Attorney, Agent, or Firm — Holtz, Holtz, Goodman & Chick, PC

(57) ABSTRACT

A recording apparatus receives, with respect to an identical program, high image quality digital broadcasting data and low image quality digital broadcasting data, records the high image quality program data and the low image quality program data in a recording medium. When a cellular phone device is connected to the recording apparatus, the recording apparatus transfers the recorded low image quality program data to the cellular phone device via a communication interface. The recording apparatus transmits, to the portable cellular phone device, management information of the end of playback and deletion of the first program data whose program is identical to that of the transferred second program data.

10 Claims, 19 Drawing Sheets

U.S. PATENT DOCUMENTS

| | | | |
|---|---|---|---|
| 6,275,497 B1 * | 8/2001 | Varma et al. | 370/431 |
| 6,990,202 B2 * | 1/2006 | Wee et al. | 380/200 |
| 7,319,885 B2 * | 1/2008 | Mukai et al. | 455/550.1 |
| 7,636,544 B2 * | 12/2009 | Yamada et al. | 455/3.01 |
| 7,653,671 B2 * | 1/2010 | Ikezawa et al. | 707/999.206 |
| 2003/0068040 A1 | 4/2003 | Wee et al. | |
| 2004/0073321 A1 | 4/2004 | Kondo | |
| 2004/0148600 A1 | 7/2004 | Hoshino | |
| 2005/0031092 A1 * | 2/2005 | Umemura et al. | 379/88.13 |
| 2007/0162623 A1 | 7/2007 | Kondo | |

FOREIGN PATENT DOCUMENTS

| | | |
|---|---|---|
| EP | 1324604 A2 | 7/2003 |
| EP | 1441287 A2 | 7/2004 |
| GB | 2407745 A | 5/2005 |
| JP | 2004-030812 A | 1/2004 |
| JP | 2004-289712 A | 10/2004 |
| JP | 2004-336464 A | 11/2004 |
| JP | 2005-109828 A | 4/2005 |
| JP | 2005-204064 A | 7/2005 |
| WO | WO 03/030543 A1 | 4/2003 |

OTHER PUBLICATIONS

Walker. M D, et al, "Mobile video-streaming", BT Technology Journal, Springer, Dordrecht, NL, vol. 21, No. 3, Jul. 2003, pp. 192-2002 XP-001171241, ISSN: 1358-3948.

Chinese Office Action dated Jan. 22, 2010 and English translation thereof issued in a counterpart Chinese Application No. 200680001626.8.

Japanese Office Action dated Jun. 15, 2010 and English translation thereof, issued in counterpart Japanese Application No. 2006-120041.

Japanese Office Action dated Feb. 22, 2011 and English translation thereof in counterpart Japanese Application No. 2006-120041.

* cited by examiner

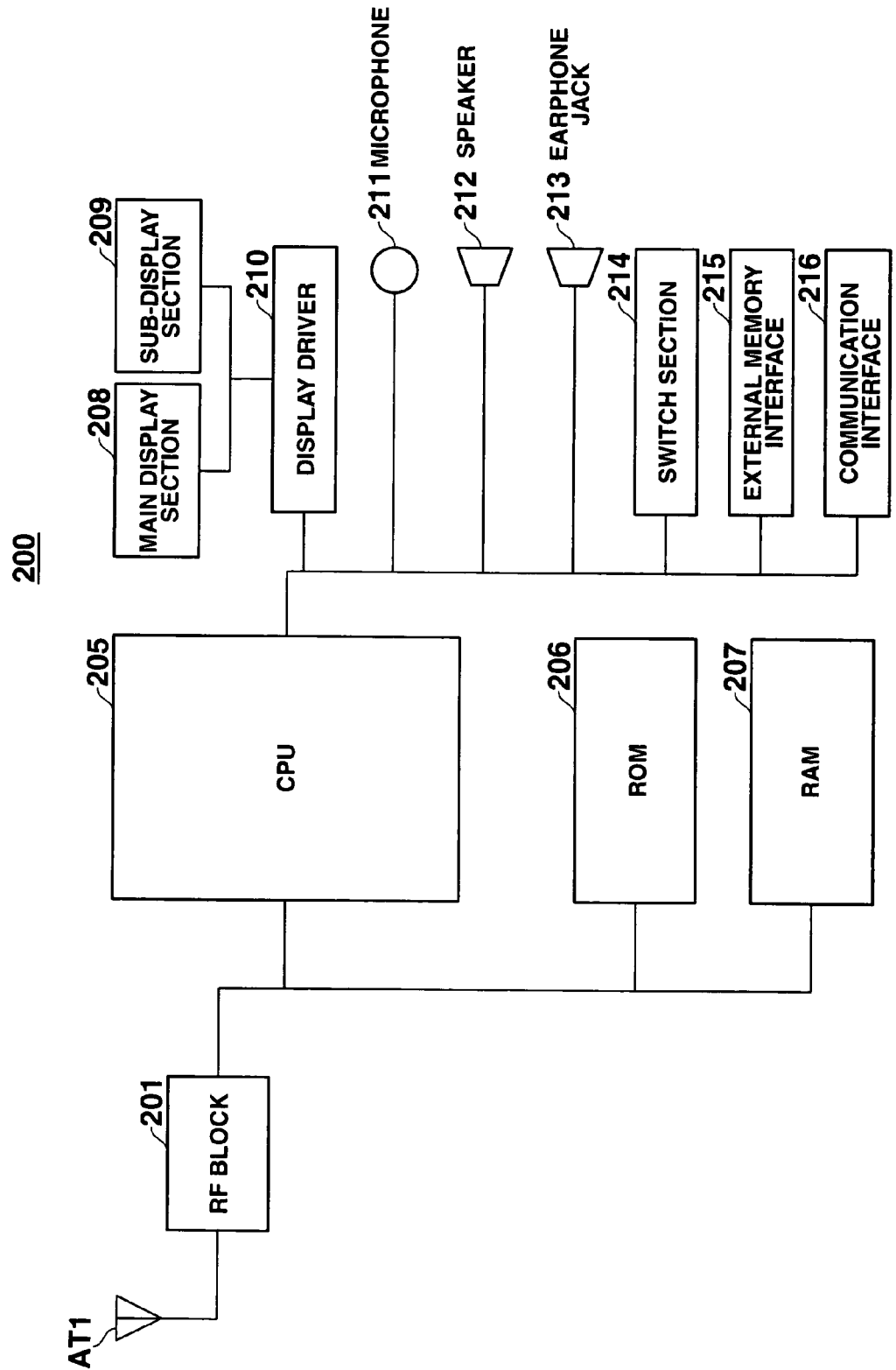

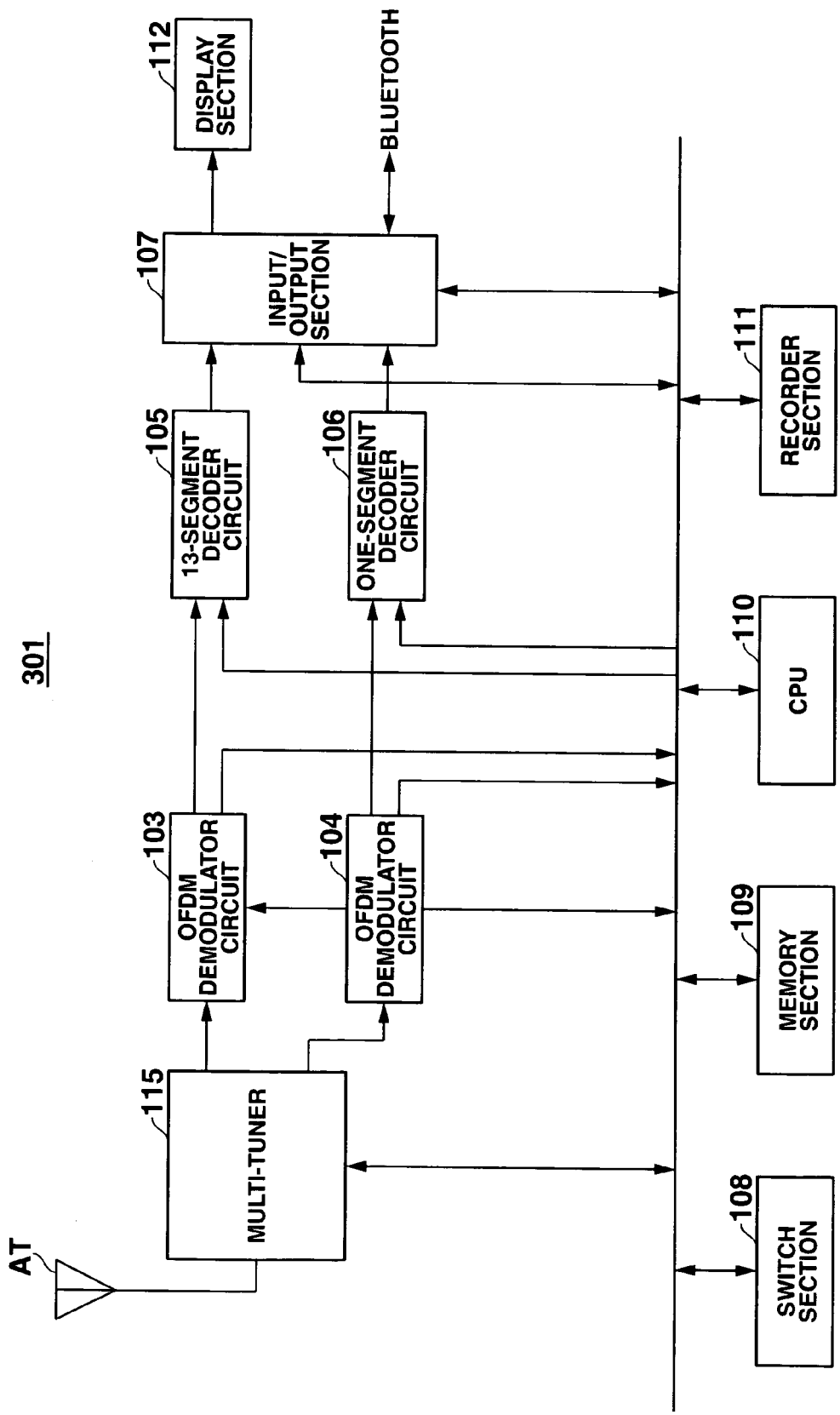

RECORDING APPARATUS, MOBILE RECEIVER APPARATUS AND DATA MANAGEMENT METHOD

CROSS-REFERENCE TO RELATED APPLICATIONS

This application is based upon and claims the benefit of priority from prior Japanese Patent Applications No. 2005-247591, filed Aug. 29, 2005; and No. 2006-120041, filed Apr. 25, 2006, the entire contents of both of which are incorporated herein by reference.

BACKGROUND OF THE INVENTION

1. Field of the Invention

The present invention relates to a recording apparatus, a mobile receiver apparatus, and a data management method. More particularly, the present invention relates to a recording apparatus, a mobile receiver apparatus, and a data management method for receiving digital broadcast data of an identical program, which are for a fixed receiver apparatus and the mobile receiver apparatus, and processing respective program data.

2. Description of the Related Art

In addition to BS broadcasting and CS broadcasting that have been already started using a broadcast satellite and a communication satellite, a terrestrial digital broadcast is about to be started.

For example, in Japan, the terrestrial broadcasting has been started in some areas since December, 2003. In 2011, all conventional analog terrestrial broadcasting will be substituted by digital broadcasting.

The terrestrial digital broadcasting provides service for simultaneously distributing a high resolution/high image quality HDTV (high-definition television) broadcast for a fixed receiver apparatus as well as simplified moving image broadcast for a mobile receiver apparatus having a small display screen.

In the terrestrial digital broadcasting in Japan, for example, the service multiplexes plural types of information such as video information, audio information, and text information in a transport stream of an MPEG-2 system in accordance with an orthogonal frequency division multiplexing (OFDM) system, and transmits the stream by dividing a bandwidth of about 6 MHz into 13 segments. That is, a bandwidth of about 429 kHz is configured as one segment, and about 6 MHz obtained by combining 13 segments is used. From among these 13 segments, a high resolution/high image quality HDTV (high-definition television) broadcast for a fixed receiver apparatus having a large display screen is transmitted using 10 to 13 segments. Further, a simplified moving image broadcasting using one segment is scheduled for a mobile receiver apparatus having a small display screen such as a cellular phone device, personal digital assistant (PDA), and a car navigation system.

Therefore, with respect to an identical program, 13-segment terrestrial digital broadcast can be received by a fixed receiver apparatus, and at the same time, one-segment terrestrial digital broadcast can be received by a mobile receiver apparatus. In consideration of service for providing digital broadcast to such fixed and mobile receiver apparatuses, some proposals for inventions have been made conventionally.

For example, in Jpn. Pat. Appln. KOKAI Publication No. 2004-289712, there is disclosed a digital broadcast receiver capable of presenting a suitable decode signal according to a type of usage of a user. In this document, a tuner module having a tuner section for receiving a digital broadcast and a demodulator section for demodulating a signal from the tuner section is connected to a general-purpose terminal device having a processor section for performing image processing on the signal from the tuner module and a display section for displaying a signal from the processor section to enable viewing of a digital broadcast. In this case, if a screen size presented by the display section is equal to or greater than a set size, the general-purpose terminal device controls the tuner module to receive a 13-segment broadcast. On the other hand, if the screen size presented by the display section is smaller than the set size, the general-purpose terminal device controls the tuner module to receive a one-segment broadcast.

In addition, according to an information processing apparatus disclosed in Jpn. Pat. Appln. KOKAI Publication No. 2005-109828, there are provided a telephone function and a broadcast receiver function together, and processing is restricted or automated depending on a status of use, thereby achieving a maximum function with limited power resources. The information processing apparatus includes: a tuner section for receiving and demodulating a broadcast signal; a mobile communication section for communicating with a base station, thereby communicating with another mobile station; a battery section for supplying power to the tuner section and the mobile communication section; and a control section for, when the mobile communication section receives a call from the base station when the tuner section is receiving the broadcast signal, performing control to reduce power supply from the battery section for receiving the broadcast signal. For example, power supply to the tuner section is interrupted or 13-segment broadcast reception is changed to one-segment broadcast reception.

In addition, according to the recording apparatus and the mobile terminal device described in Jpn. Pat. Appln. KOKAI Publication No. 2005-204064, the programs of broadcasts provided using different bandwidths in the same channel can be recorded at the same time. In addition, if a plurality of apparatuses are used for reproducing the same recorded program, the reproduction can be smoothly carried out. In this configuration, a 12-segment broadcast and a one-segment broadcast are received by two tuners, and 13-segment and one-segment signals are demodulated by two OFDM demodulator circuits corresponding to these two broadcasts. Data obtained by two demodulations are stored in an image storage section.

If a one-segment terrestrial digital broadcast is received by using a mobile unit such as a cellular phone device or a PDA as a receiver apparatus, there is a problem that a battery voltage is lowered due to power consumption in a tuner section, thus making it difficult to provide viewing for a long time. In addition, there is a problem that a limited recording capacity of a recording medium such as a memory card for recording received program data makes it difficult to record a large amount of program data. However, in the above configurations described in Jpn. Pat. Appln. KOKAI Publication No. 2004-289712 and Jpn. Pat. Appln. KOKAI Publication No. 2005-109828, such problems associated with power consumption and limited recording capacity cannot be solved.

In this regard, in the above configuration described in Jpn. Pat. Appln. KOKAI Publication No. 2005-204064, 13-segment and one-segment program data are recorded in a recording apparatus (included in a fixed receiver apparatus) at the same time, thus solving the problems associated with power consumption and limited recording capacity. In this case, when a mobile terminal device is selected by user operation, one-segment encoded program data stored in an image storage section of a recording apparatus is decoded by a decoder circuit, and the decoded data is transmitted to the mobile terminal device via a wireless (Bluetooth®) transmission channel. However, there is a need for an operation of specifying program data stored in the image storage section of the recording apparatus and an operation of selecting a wireless channel as a transmission channel by a switch section of the recording apparatus. Therefore, there is a problem that switch operation becomes complicated. Further, in order for the recording apparatus and the mobile terminal device to share playback position information (the serial number of an Ith frame), there is a need for copying one-segment program data from the recording apparatus to the portable terminal device, and storing the same program data in both of them. However, almost all of the contents of programs distributed in BS broadcasting and CS broadcasting as well as terrestrial digital broadcasting are protected by copyright, and the received and recorded (copied) program data is subject to "Copy Once". Thus it is impossible to further copy the recorded program data, and store the same program data in a plurality of apparatuses.

BRIEF SUMMARY OF THE INVENTION

The present invention has been made to solve such conventional programs.

It is an object of the present invention to solve a problem associated with power consumption and limited recording capacity in a mobile receiver apparatus such as a mobile terminal device.

It is another object of the present invention to enable transfer of received and recorded program data to a mobile receiver apparatus without the need of a switch operation.

It is a further object of the present invention to conform to copyright protection of "Copy Once".

According to one embodiment of the present invention, a recording apparatus receives, with respect to an identical program, first digital broadcast data having a high image quality for a fixed receiver apparatus and second digital broadcast data having a low image quality for a mobile receiver apparatus; demodulates first program data for the fixed receiver apparatus and second program data for the mobile receiver apparatus; and records the demodulated first and second program data in a recording medium. If it is detected that the mobile receiver apparatus is connected to the recording apparatus, the second program data recorded in the recording medium is transferred to the mobile receiver apparatus.

BRIEF DESCRIPTION OF THE SEVERAL VIEWS OF THE DRAWING

FIG. 2 is a block diagram depicting a configuration of a cellular phone device according to the first embodiment of the present invention;

FIG. 19 is a block diagram depicting a configuration of a recording apparatus according to a third embodiment of the present invention.

DETAILED DESCRIPTION OF THE PREFERRED EMBODIMENT

Hereinafter, referring to each of FIGS. 1 to 17, 18 and 19, a detailed description will be given with respect to a first embodiment, a second embodiment, and a third embodiment of a recording apparatus, a mobile receiver apparatus, and a data management method between these apparatuses according to the embodiments. In the Japanese Association of Radio Industries and Business (ARIB) standard, high definition/high image quality HDTV is configured to assign 12 of 13 segments, as described in Jpn. Pat. Appln. KOKAI Publication No. 2005-204064. In general, this kind of broadcasting is referred to as "13-segment broadcasting", and thus, in the first embodiment as well, a term "13 segments" is used.

In addition, with respect to the contents common to the first embodiment to the third embodiment, common terms or terms of the generic concept for the first embodiment to the third embodiment are used in order to avoid duplicate and redundant descriptions. For example, high image quality digital broadcasting for a fixed receiver (also referred to as a "stationary receiver") provided indoors denotes 13-segment digital broadcasting in the first embodiment and denotes digital broadcasting in a bandwidth of frequency f1 in the second embodiment. In addition, low image quality digital broadcasting for a mobile receiver such as a cellular phone device, personal digital assistant (PDA), or a car navigation device denotes one-segment digital broadcasting in the first embodiment and digital broadcasting in a bandwidth of frequency f2 in the second embodiment. However, the term "low image quality" does not denote a poor image quality. One frame having a small number of pixels for a mobile receiver having a small display screen, in contrast to a "high image quality" of one frame having a large number of pixels for a fixed receiver having a large display screen, is defined as a "low image quality" for convenience.

Figure 1:
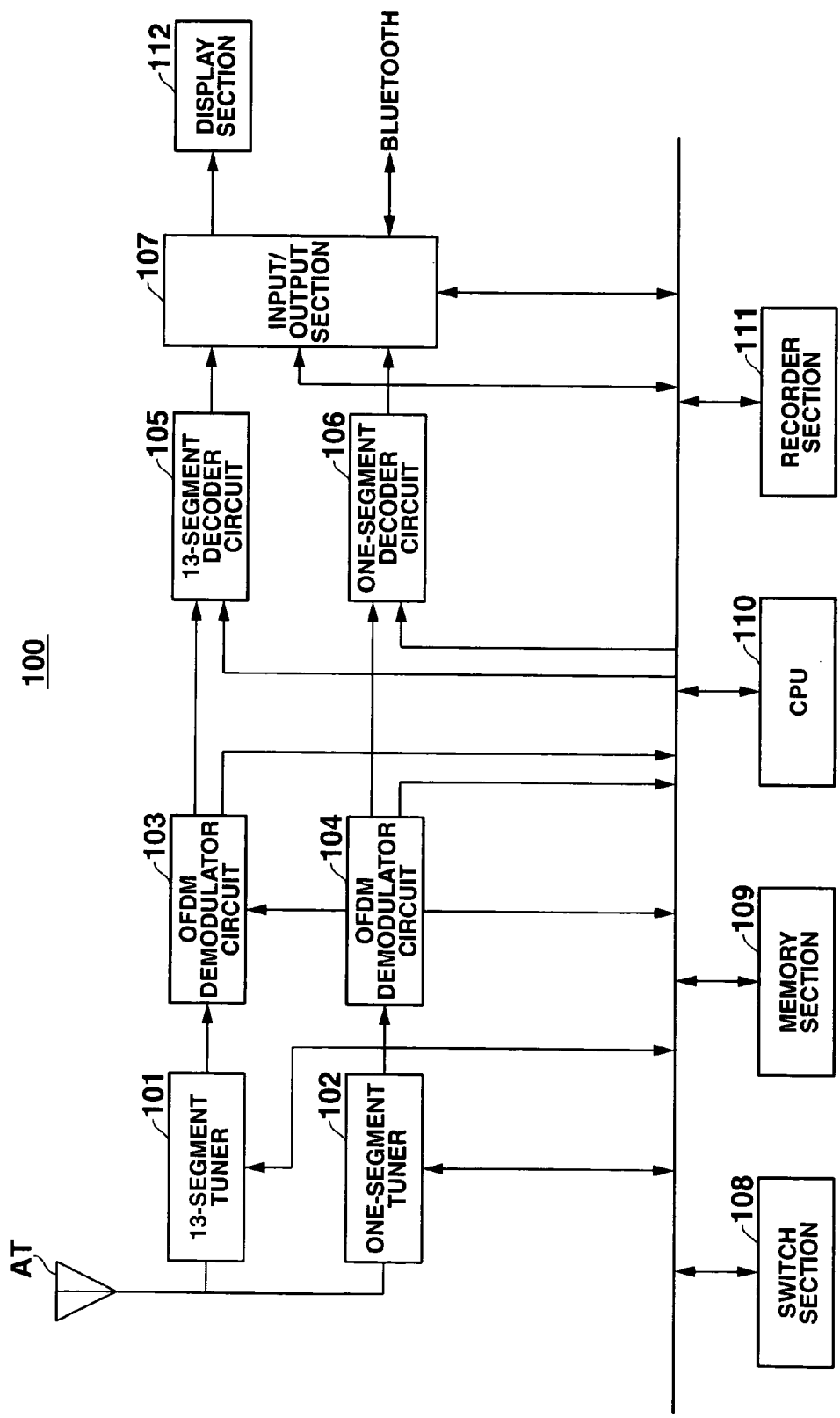
FIG. 1 is a block diagram depicting a configuration of a recording apparatus according to a first embodiment of the present invention.

FIG. 1 is a block diagram depicting a configuration of a recording apparatus 100 in the first embodiment. The recording apparatus 100 receives radio waves of the 13-segment digital broadcasting and one-segment digital broadcasting in terrestrial digital broadcasting via an antenna AT. A 13-segment tuner 101 selects a received signal based on a set channel from among the 13-segment radio waves obtained from the antenna AT. A one-segment tuner 102 selects a received signal based on the same set channel as that of the 13 segment channel from among the one-segment radio waves obtained from the antenna AT. An orthogonal frequency division multiplexing (OFDM) demodulator circuit 103 demodulates a received signal of 13 segments selected by the tuner 101. The OFDM demodulator circuit 104 demodulates a received signal of one segment selected by the tuner 102. A 13-segment decoder circuit 105 decodes the received signal demodulated by the OFDM demodulator circuit 103 to 13-segment program data including video data and audio data. A one-segment decoder circuit 106 decodes the received signal demodulated by the OFDM demodulator circuit 104 to one-segment program data including video data and audio data. An input/output section 107 displays on a display section 112 an image of the 13-segment program data decoded by the decoder circuit 105. In addition, the input/output section 107 outputs the one-segment program data decoded by the decoder circuit 106 to a Bluetooth wireless transmission channel, and transfers the data to a cellular phone device 200 described later.

A CPU 110 is connected via a system bus to the above-described tuners 101 and 102, OFDM demodulated circuits 103 and 104, decoder circuits 105 and 106, and input/output section 107 and connected to a switch section 108, a memory section 109, and a recorder section 111. The CPU 110 executes a control program stored in the memory section 109 in response to an operation of the switch section 108, temporarily stores data in the memory section 109, and controls the recording apparatus 100. The recorder section 111 is formed by, for example, a hard disk drive, and records 13-segment program data demodulated by the OFDM demodulator circuit 103 and one-segment program data demodulated by the OFDM demodulator circuit 104, i.e., encoded program data. Hereinafter, the recorded program data is referred to as "recorded data". The 13-segment recorded data recorded in the recorder section 111 is decoded by the decoder circuit 105, and the decoded data is output from the input/output section 107 to the display section 112. On the other hand, the one-segment recorded data recorded in the recorder section 111 is decoded by the decoder circuit 106, and the decoded data is output from the input/output section 107 to a Bluetooth wireless transmission channel.

FIG. 2 is a block diagram depicting a configuration of a cellular phone device 200 according to an embodiment of a mobile receiver apparatus. The cellular phone device 200 includes an antenna AT1 for transmitting and receiving a call signal or E-mail signal. An RF block 201 carries out frequency conversion or modulation/demodulation and the like of a signal transmitted or received by the antenna AT1. A CPU 205 executes a program for controlling the whole cellular phone device 200. A ROM 206 stores default data and a program executed by the CPU 205. A RAM 207 is provided as a work area for temporarily storing the data processed by the CPU 205. A main display section 208 and a sub-display section 209 are driven by a display driver 210, and image data is displayed by a processing operation of the CPU 205. A microphone 211 inputs voice, and a speaker 212 and an earphone (not shown) connected to an earphone jack 213 outputs sound. A switch section 214 inputs an instruction or data in response to a user operation. A communication interface 216 receives Bluetooth wireless one-segment recorded data transferred from the recording apparatus 100 shown in FIG. 1. An external memory interface 215 writes the recorded data received by the communication interface 216 into an external memory (not shown); reads out the recorded data from the external memory in response to a playback instruction from the switch section 214; and causes the CPU 205 to carry out a reproducing processing operation, and causes the main display section 208 to display the reproduced data.

Figure 3A:
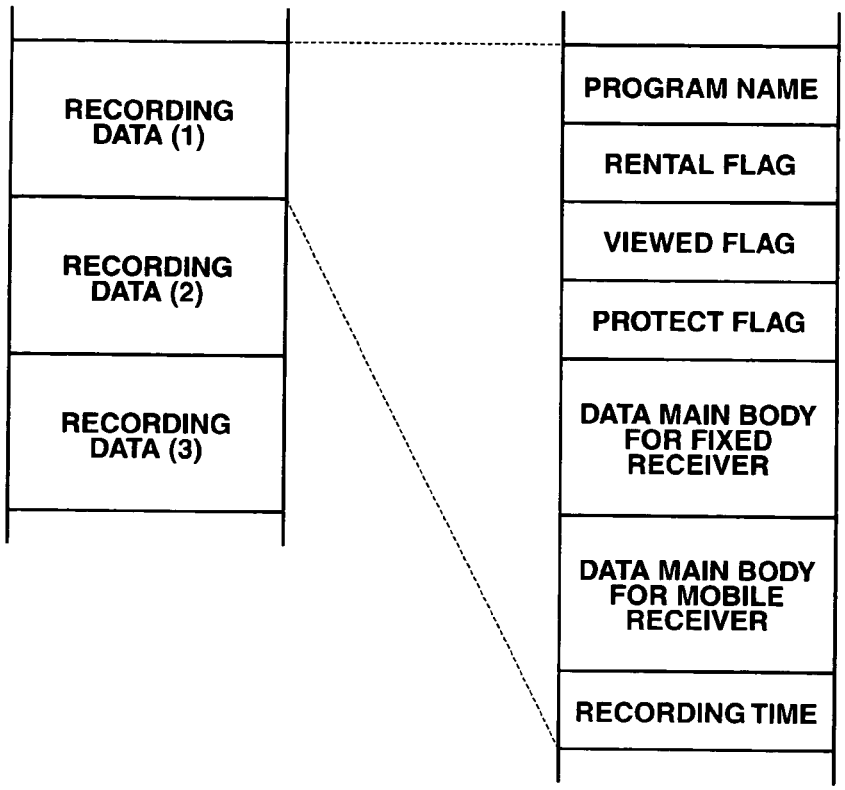
FIGS. 3A and 3B show diagrams depicting recorded data recorded in the recording apparatus and the cellular phone device according to the first embodiment.
Figure 3B:
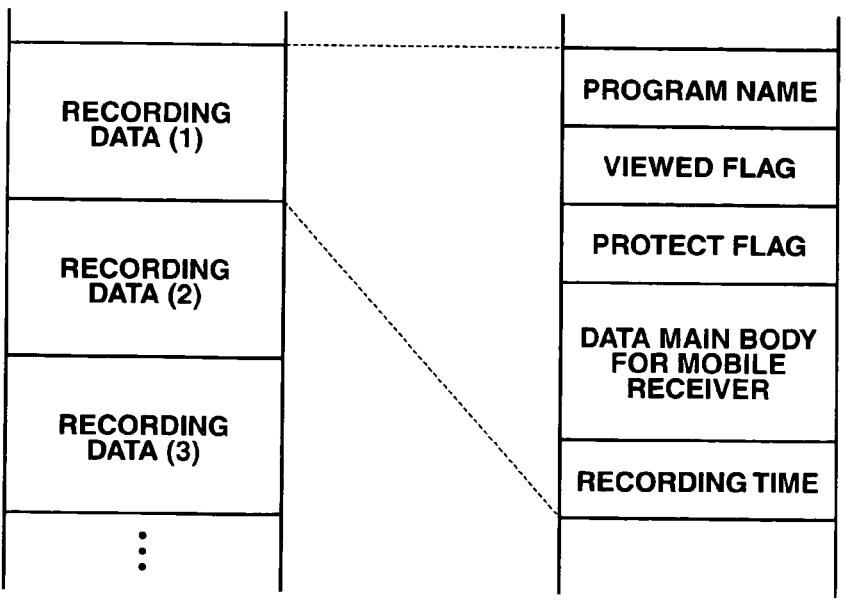

FIGS. 3A and 3B show configurations of recorded data obtained by recording terrestrial digital broadcasting. FIG. 3A shows recorded data recorded in the recorder section 111 of the recording apparatus 100. The recorded data is composed of a program name, a rental flag, a viewed flag, a protect flag, a high image quality 13-segment recorded data main body for a fixed receiver, a low image quality one-segment recorded data main body for a mobile receiver, and an recording time. FIG. 3B shows recorded data stored in an external memory attached to a cellular phone device 200. The recorded data is composed of a program name, a viewed flag, a protect flag, a recorded data main body for a mobile receiver, and a recording time.

Now, an operation according to the present embodiment will be described with reference to flowcharts of operations shown in FIGS. 4 to 12 executed by the CPU 110 of the recording apparatus 100 and flowcharts of operations shown in FIGS. 13 to 17 executed by the CPU 205 of the cellular phone device 200.

Figure 4:
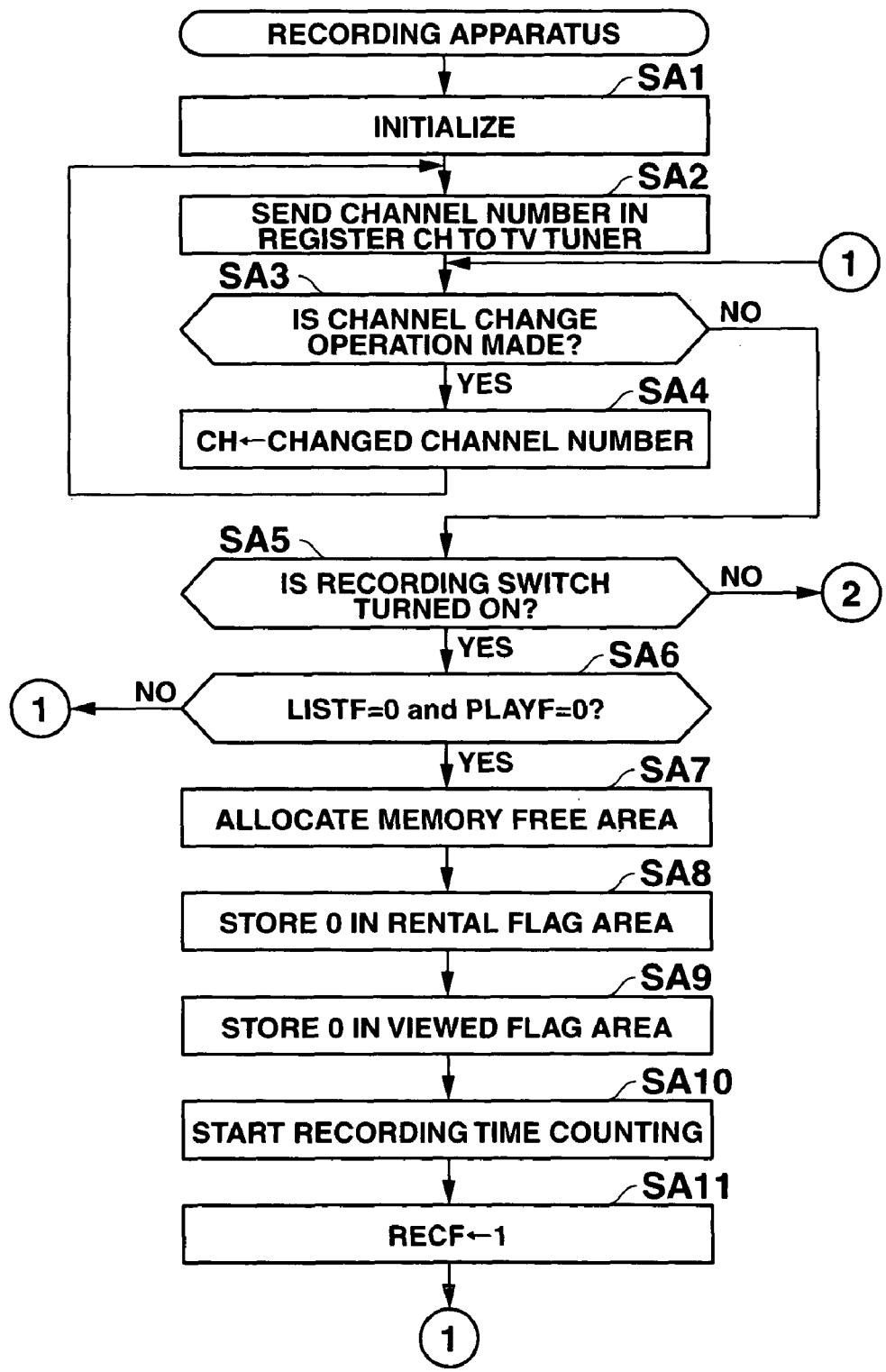
FIG. 4 is a flowchart showing an operation of the recording apparatus executed by a CPU shown in FIG. 1.

In the flowchart shown in FIG. 4, the CPU 110 carries out initialization (step SA1), and then, sends a channel number in a register CH to a TV tuner (the 13-segment tuner 101, one-segment tuner 102) (step SA2). Next, the CPU 110 determines whether or not a channel change operation is made (step SA3). When the channel change operation is made, the CPU 110 stores the changed channel number in the register CH (step SA4).

If the channel change operation is not made, the CPU 110 determines whether or not a recording switch is turned on (step SA5). When the switch is turned on, it is determined whether or not a list display flag LISTF of image recorded data is set to 0 (list not displayed) and a playback flag PLAYF is set to 0 (playback stopped state) (step SA6). If the flag LISTF is set to 1 (list is displayed) or the flag PLAYF is set to 1 (playback state), the CPU 110 proceeds to step SA3 and searches for on/off setting of another switch. If the flags LISTF and PLAYF are set to 0, the CPU reserves a memory space, i.e., a free area of the recorder section 111 (step SA7). The CPU 110 stores 0 in an area of a rental flag in the reserved area (step SA8), and stores 0 in an area of a viewed flag in the reserved area (step SA9). Next, the CPU 110 starts counting of a recording time (step SA10), and sets recording flag RECF (recording state) to 1 (step SA11).

If the channel change operation is not made in step SA3 and the recording switch is not turned on in step SA5, the CPU 110 searches for on/off setting of another switch. That is, in the flowchart shown in FIG. 5, the CPU 110 determines whether or not a list display switch is turned on (step SA12). When the switch is turned on, it is determined whether or not the flag RECF is set to 0 (recording stopped state) and whether or not the flag PLAYF is set to 0 (step SA13). If the flag RECF is set to 1 or the flag PLAYF is set to 1, the CPU 110 proceeds to step SA3 and searches for on/off setting of another switch. If the flags RECF and PLAYF are set to 0, the CPU 110 displays a playback list screen (step SA14).

Figure 12:
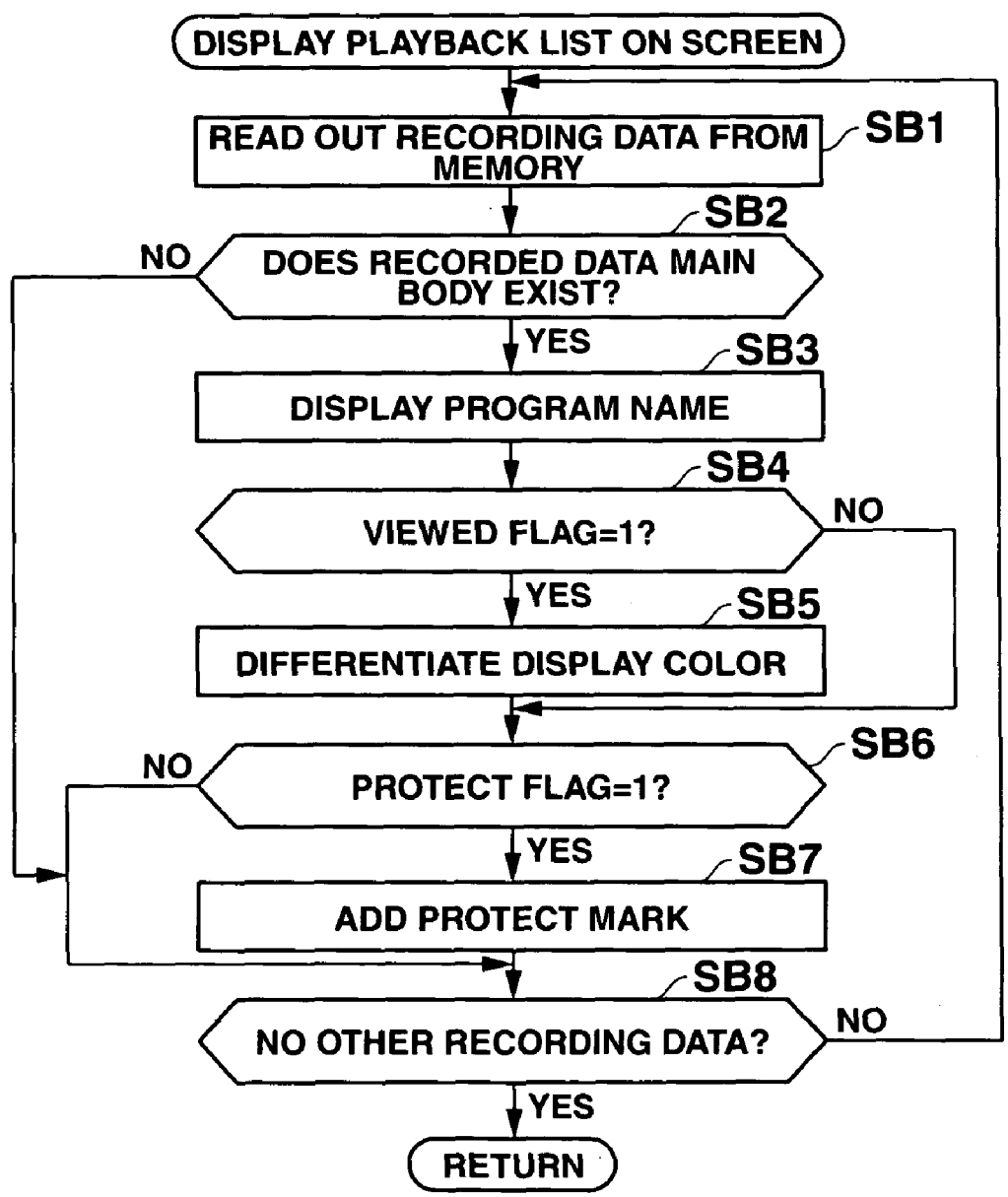
FIG. 12 is a flowchart showing a processing operation of displaying a playback list on a screen shown in FIG. 5.

FIG. 12 is a flowchart showing a processing operation of displaying a playback list on a screen. The CPU 110 first reads out image recorded data from a memory (step SB1), and determines whether or not an image recorded data main body exists in the read out image recorded data (step SB2). If the image recorded data main body exists, the CPU 110 displays the program name (step SB3), and determines whether or not a viewed flag is set to 1 (viewed) (step SB4). If the flag is set to 1, the display color of the program name is made different in order to explicitly indicate that the program has been viewed (step SB5). Next, the CPU 110 determines whether or not the protect flag is set to 1 (deletion disabled) (step SB6). If the flag is set to 1, a protect mark is added to the program name in order to explicitly indicate that deletion is disabled (step SB7). After such a display processing operation, or if no image recorded data main body exists in step SB2, the CPU 110 determines whether or not another item of recorded data exists by searching the memory (step SB8). If such another item of image recorded data exists, the CPU 110 proceeds to step SB1 in which the recorded data is read out, and the above-described processing operation is repeated. If such another item of recorded data does not exist, the CPU 110 reverts to the flowchart shown in FIG. 5, and the flag LISTF is set to 1 (list display state) (step SA15). Next, the CPU 110 highlights one program name by displaying it in reversed contrast in the displayed list (step SA16). Then, the CPU 110 proceeds to step SA3 shown in FIG. 4 and searches for on/off setting of another switch.

Figure 5:
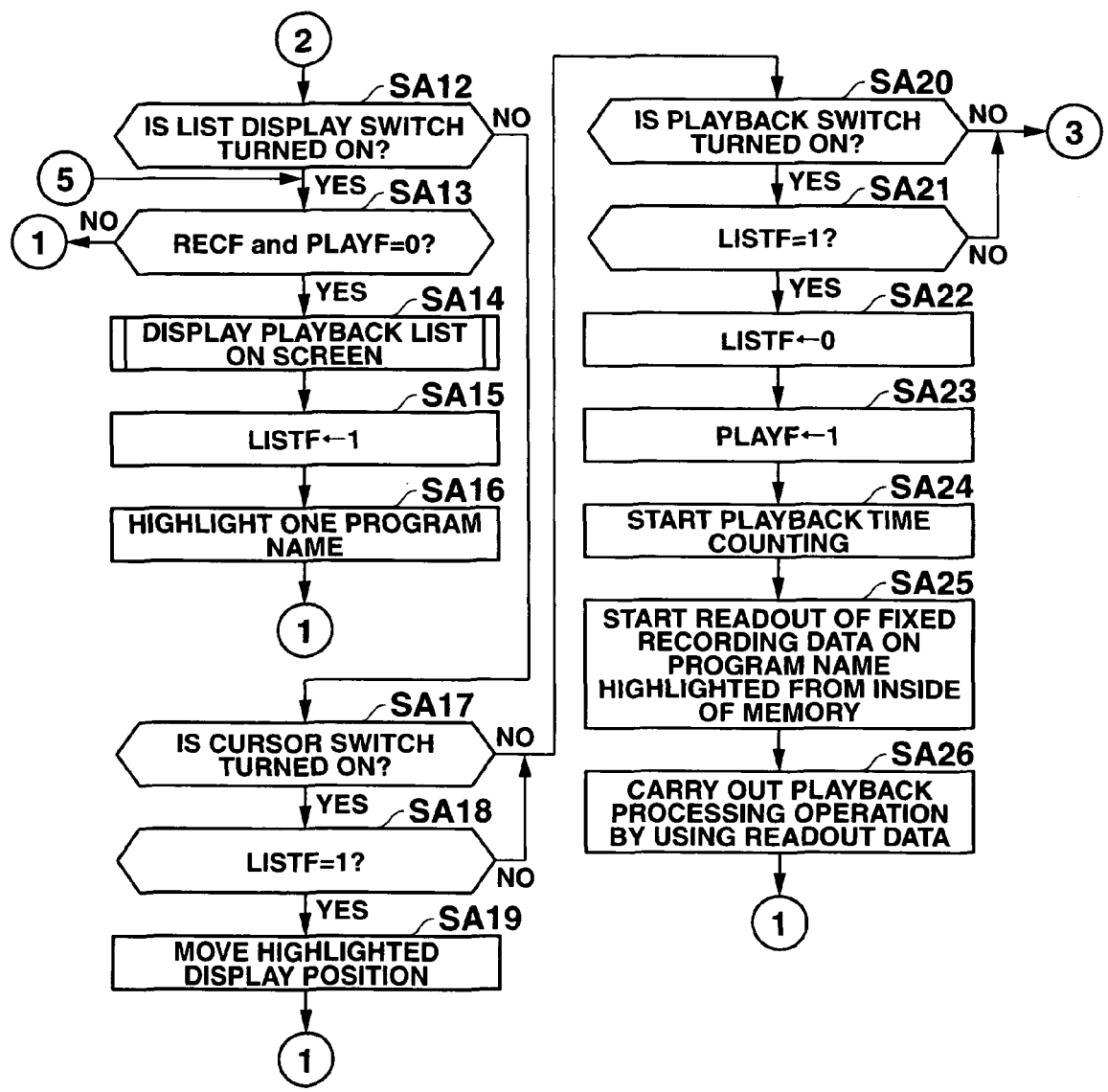
FIG. 5 is a flowchart showing an operation of the recording apparatus that follows the operation shown in FIG. 4.

In step SA12 shown in FIG. 5, if the list display switch is been turned on, the CPU 110 determines whether or not a cursor switch is turned on (step SA17). When the switch is turned on, it is determined whether or not the flag LISTF is set to 1 (step SA18). If the flag is set to 1 and a list is displayed, the CPU 110 moves the position of a highlighted display (step SA19). That is, the CPU 110 changes a specified program name. The CPU 110 proceeds to step SA3 shown in FIG. 4, and searches for on/off setting of another switch.

If the cursor switch is not turned on in step SA17, or if the flag LISTF is set to 0 in step SA18, the CPU 110 determines whether or not a playback switch is turned on (step SA20). When the switch is turned on, it is determined whether or not the flag LISTF is set to 1 (step SA21). If the flag is set to 1, the CPU 110 resets the flag LISTF to 0 (step SA22), and sets the flag PLAYF to 1 (step SA23). Next, the CPU 110 starts playback time counting (step SA24), and starts reading recorded data for a fixed receiver of a highlighted program name from the memory (step SA25). Next, the CPU 110 carries out a reproducing processing operation by using the readout recorded data (step SA26). Then, the CPU 110 proceeds to step SA3 shown in FIG. 4, and searches for on/off setting of another switch.

Figure 6:
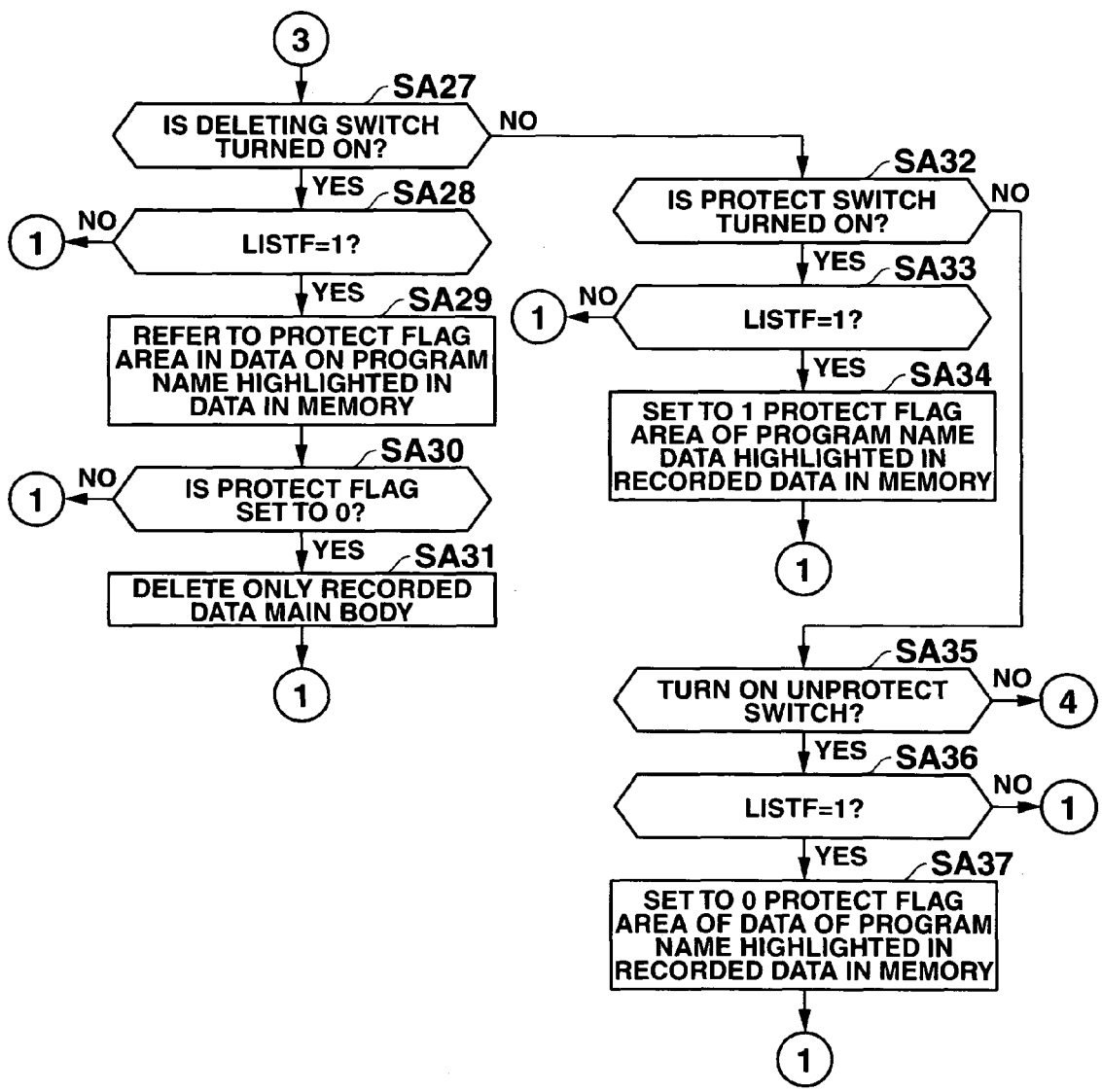
FIG. 6 is a flowchart showing an operation of the recording apparatus that follows the operation shown in FIG. 5.

If the playback switch is not turned on in step SA20 or if the flag LISTF is set to 0 in step SA21, the CPU 110 determines whether or not a deletion switch is turned on in the flowchart shown in FIG. 6 (step SA27). When the switch is turned on, it is determined whether or not the flag LISTF is set to 1 (step SA28). If the flag is set to 0 and a list of program names is not displayed, the CPU 110 proceeds to step SA3 shown in FIG. 4 and searches for on/off setting of another switch. If the flag is set to 1, reference is made to the protect flag of data of a program name highlighted in the recorded data in the memory (step SA29). Next, the CPU 110 determines whether or not the protect flag is set to 0 (step SA30). If the flag is set to 1, deletion is disabled. Thus, the CPU 110 proceeds to step SA3 shown in FIG. 4, and a search is made for on/off setting of another switch. However, if the flag is set to 0, only the recorded data main body is deleted (step SA31). Then, the CPU 110 proceeds to step SA3 shown in FIG. 4 and searches for on/off setting of another switch.

In step SA27, if the deletion switch is not turned on, the CPU 110 determines whether or not a protect switch is turned on (step SA32). When the switch is turned on, it is determined whether or not the flag LISTF is set to 1 (step SA33). If the flag is set to 0 and a list of program names is not displayed, the CPU 110 proceeds to step SA3 shown in FIG. 4 and searches for on/off setting of another switch. However, if the flag is set to 1, an area of the protect flag of data of a program name highlighted in the recorded data in the memory is set to 1 (deletion disabled) (step SA34). Then, the CPU 110 proceeds to step SA3 shown in FIG. 4 and searches for on/off setting of another switch.

In step SAS32, if the protect switch is not turned on, the CPU 110 determines whether or not an unprotect switch is turned on (step SA35). When the switch is turned on, it is determined whether or not the flag LISTF is set to 1 (step SA36). If the flag is set to 0 and a list of program names is not displayed, the CPU 110 proceeds to step SA3 shown in FIG. 4 and searches for on/off setting of another switch. However, if the flag is set to 1, an area of the protect flag of data of a program name highlighted in the recorded data in the memory is set to 0 (deletion enabled) (step SA37). Then, the CPU 110 proceeds to step SA3 shown in FIG. 4 and searches for on/off setting of another switch.

Figure 7:
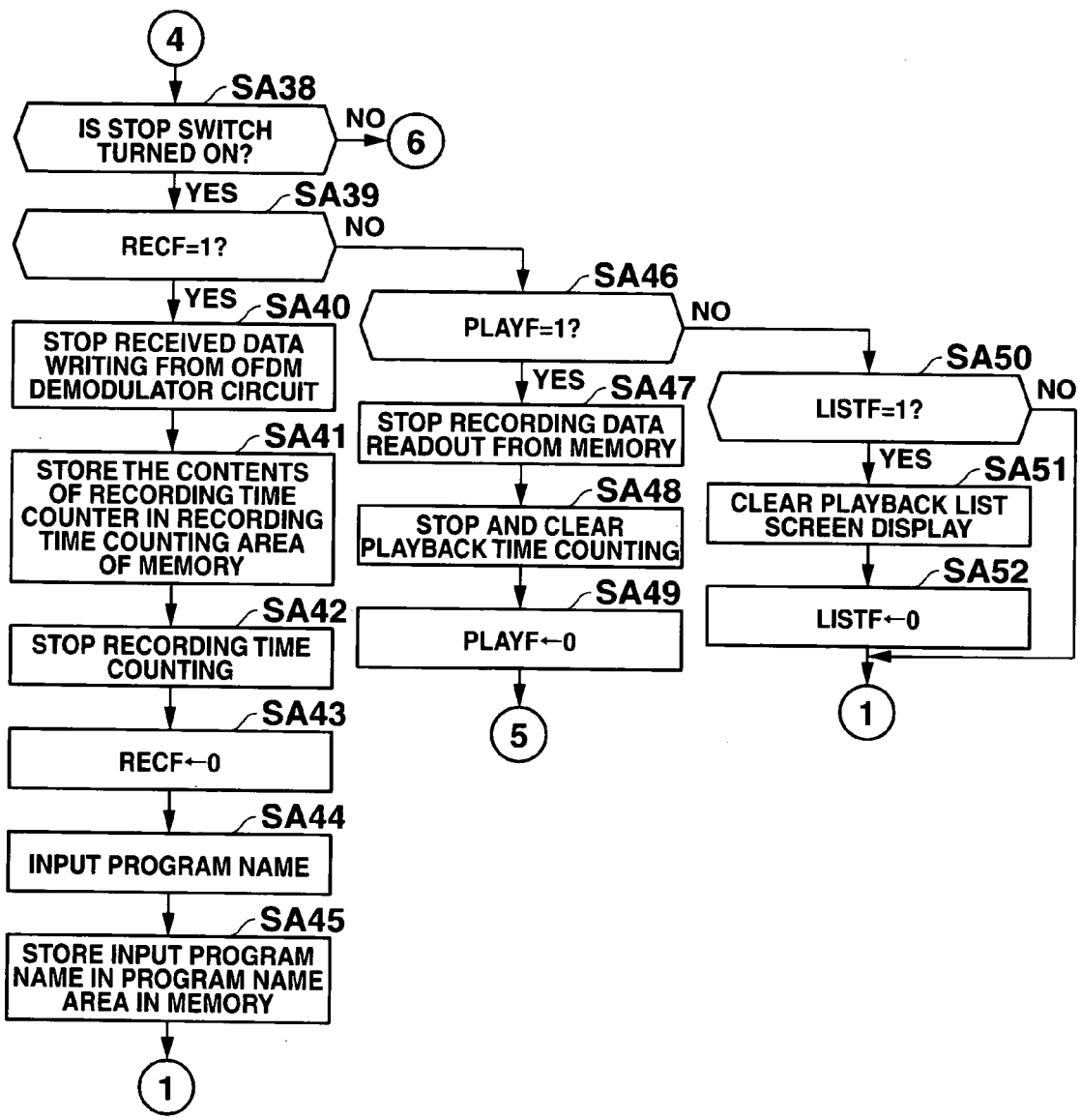
FIG. 7 is a flowchart showing an operation of the recording apparatus that follows the operation shown in FIG. 6.

If the unprotect switch is not turned on in step SA35, the CPU 110 determines whether or not a stop switch is turned on in the flowchart shown in FIG. 7 (step SA38). When the stop switch is turned on, the CPU searches for the states of the flags RECF, PLAYF, and LISTF. Next, the CPU 110 determines whether or not the flag RECF is set to 1 (recording state) (step SA39). If the flag is set to 1, an operation of turning on the stop switch is an instruction for stopping recording, and thus, writing of received data from the OFDM demodulator circuit is stopped (step SA40). Next, the CPU 110 stores the content of a recording time counter in a recording time count area of the memory (step SA41), and stops recording time counting (step SA42). Then, the CPU 110 resets the flag RECF to 0 (step SA43); inputs a program name responsive to a user operation or automatically assigned (step SA44), and stores the input program name in a program name area in the memory (step S45). Then, the CPU 110 proceeds to step SA3 shown in FIG. 4 and searches for on/off setting of another switch.

If the flag RECF is set to 0 in step SA39, the CPU 110 determines whether or not the flag PLAYF is set to (playback state) (step SA46). If the flag PALYF is set to 1, an operation of turning on the stop switch is an instruction for stopping playback, and thus, readout of recorded data from the memory is stopped (step SA47). Next, the CPU 110 stops playback time counting, and clears a count value (step SA48). Next, the CPU 110 resets the flag PLAYF to 0 (step SA49). Then, the CPU 110 proceeds to step SA13 shown in FIG. 5 and searches for the states of the flags RECF and PLAYF.

If the flag PLAYF is set to 0 in step SA46, the CPU 110 determines whether or not the flag LISTF is set to 1 (list displayed state) (step SA50). If the flag LISTF is set to 0, the CPU 110 proceeds to step SA3 shown in FIG. 4, and a search is made for on/off setting of another switch. If the flag LISTF is set to 1, an operation of turning on the stop switch is an instruction for clearing a list screen, and thus, the display of the playback list screen is cleared (step SA51). Next, the CPU 110 resets the flag LISTF to 0 (step SA52). Then, the CPU 110 proceeds to step SA3 shown in FIG. 4 and searches for on/off setting of another switch.

Figure 8:
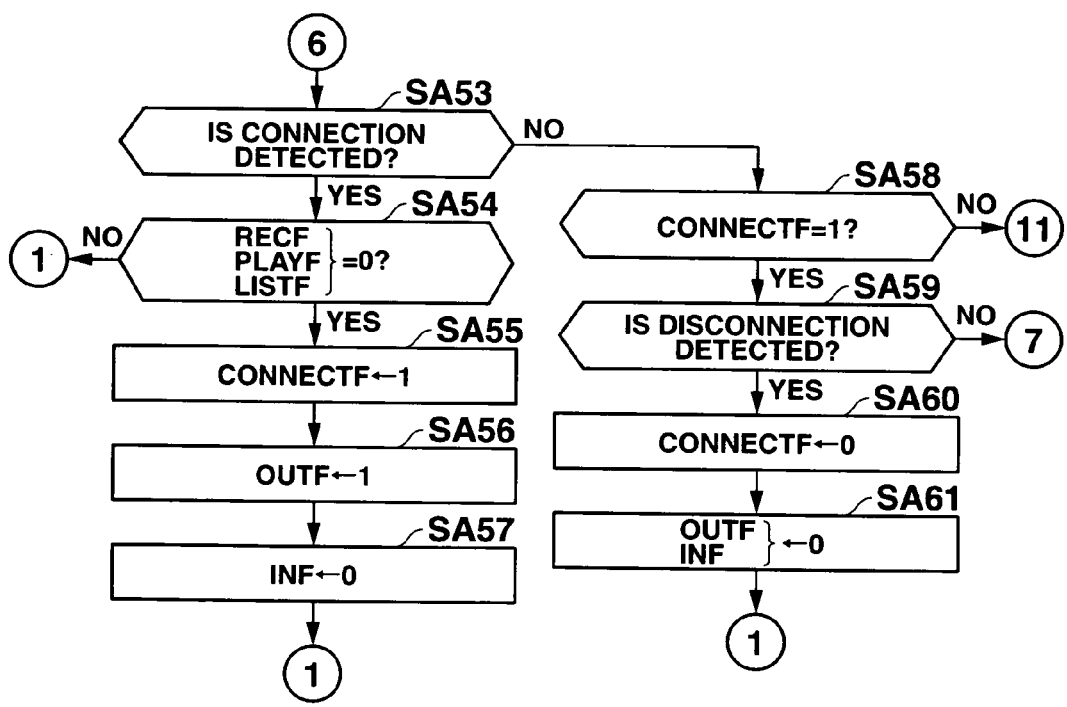
FIG. 8 is a flowchart showing an operation of the recording apparatus that follows the operation shown in FIG. 7.

If the stop switch is not turned on in step SA38 shown in FIG. 7, the CPU 110 determines whether or not Bluetooth wireless connection to the cellular phone device 200 is detected in the flowchart shown in FIG. 8 (step SA53). When the connection is detected, i.e., when an access of line connection request is issued from the cellular phone device 200, the CPU 110 determines whether or not all of the flags RECF, PLAYF, and LISTF are set to 0 (step SA54). If the three flags are set to 0 and none of a recording state, a playback state, and a list display state is established, the CPU 110 sets a connection flag CONNECTF to 1 (connection state) (step SA55). Further, the CPU 110 sets a data output flag OUTF to 1 (output state) (step SA56), and resets a data input flag INF to 0 (step SA57). Thereafter or in step SA54, if the flags RECF, PLAYF or LISTF is set to 1, the CPU 110 proceeds to step SA3 shown in FIG. 4 and searches for on/off setting of another switch.

If no connection is detected in step SA53, the CPU 110 determines whether or not the flag CONNECTF is set to 1 (step SA58). If the flag CONNECTF is set to 1, it is determined whether or not disconnection is detected (disconnection of Bluetooth wireless line to the cellular phone device 200) (step SA59). When disconnection is detected, the CPU 110 resets the flag CONNECTF to 0 (step SA60), and resets both the flags OUTF and INF to 0 (step SA61). Then, the CPU 110 proceeds to step SA3 shown in FIG. 4 and searches for on/off setting of another switch.

Figure 9:
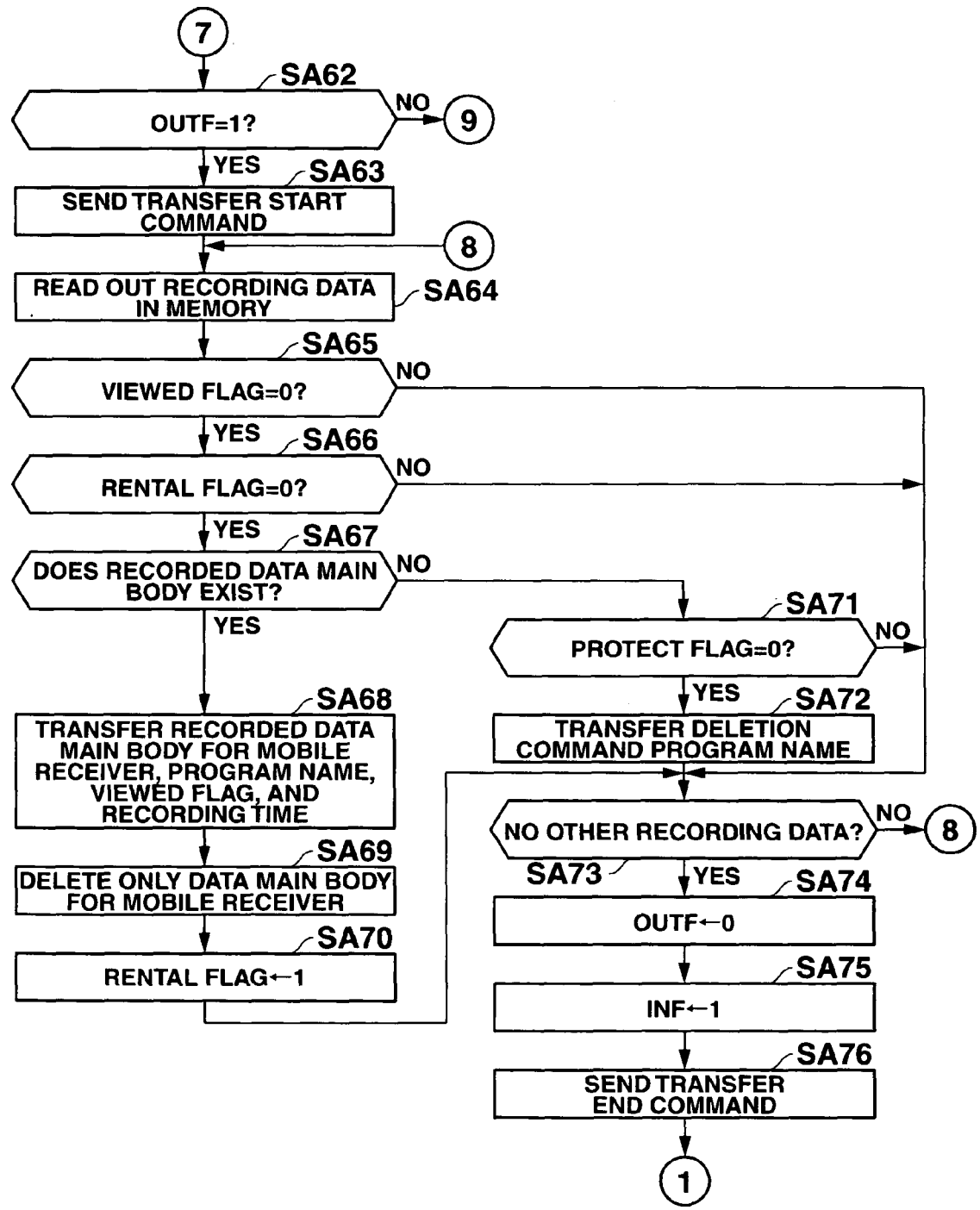
FIG. 9 is a flowchart showing an operation of the recording apparatus that follows the operation shown in FIG. 8.

If disconnection is not detected in step SA59, i.e., if Bluetooth wireless line connection to the cellular phone device 200 is established, the CPU 110 determines whether or not the flag OUTF is set to 1 in the flowchart shown in FIG. 9 (step SA62). If the flag is set to 1, a transfer start command is sent to the cellular phone device 200 (step SA63). Next, the CPU 110 reads out recorded data in the memory (step SA64), and searches for the contents of the readout recorded data and determines whether or not the viewed flag is set to 0 (step SA65). If the flag is set to 0, the CPU 110 determines whether or not the rental flag is set to 0 (step SA66). If the flag is set to 0, it is determined whether or not 13-segment and one-segment recorded data main bodies exist (step SA67). If the recorded data main body exists, the CPU 110 sends to the cellular phone device 200 the main body of recorded data for a mobile receiver, the program name, viewed flag, and recording time (step SA68). Next, the CPU 110 deletes only the one-segment recorded data main body for the mobile receiver in the memory (step SA69), and sets the rental flag to 1 (step SA70). Therefore, the recorded data main body for the mobile receiver is not copied, but is moved from the program recording apparatus 100 to the cellular phone device 200. Thus, protection of the copyright by "Copy Once" is observed.

If the recorded data main bodies for the fixed receiver and mobile receiver do not exist in step SA67, the CPU 110 determines whether or not the protect flag is set to 0 (step SA71). If the flag is set to 0, the recorded data main body for the mobile receiver has been already transferred to the cellular phone device 200. In addition, the 13-segment recorded data main body for the fixed receiver is deleted by a deleting operation by the user. In this case, the CPU 110 does not require one-segment image data for the mobile receiver transferred to the cellular phone 200, and transfers a deleting command and a program name to the cellular phone device 200 (step SA72).

After the CPU 110 transfers recorded data for the mobile receiver to the cellular phone 200, and sets the rental flag to 1 in step SA70, or after the deleting command and the program name are transferred to the cellular phone 200 in step SA72, or if the viewed flag is set to 1 (viewed) in step SA65, or if the rental flag is set to 1 (in rental) in step SA66, or if the protect flag is set to 1 (deletion disabled) in step SA71, the CPU determines whether or not another item of recorded data exists in the memory (step SA73). If another item of recorded data exists, the CPU 110 proceeds to step SA64, reads out the recorded data, and repeats the above processing operation. If another item of recorded data does not exist in the memory, the CPU 110 resets the flag OUTF to 0 (step SA74), sets the flag INF to 1 (step SA75), and sends a transfer end command to the cellular phone 200 (step SA76). Then, the CPU 110 proceeds to step SA3 shown in FIG. 4 and searches for on/off setting of another switch.

Figure 10:
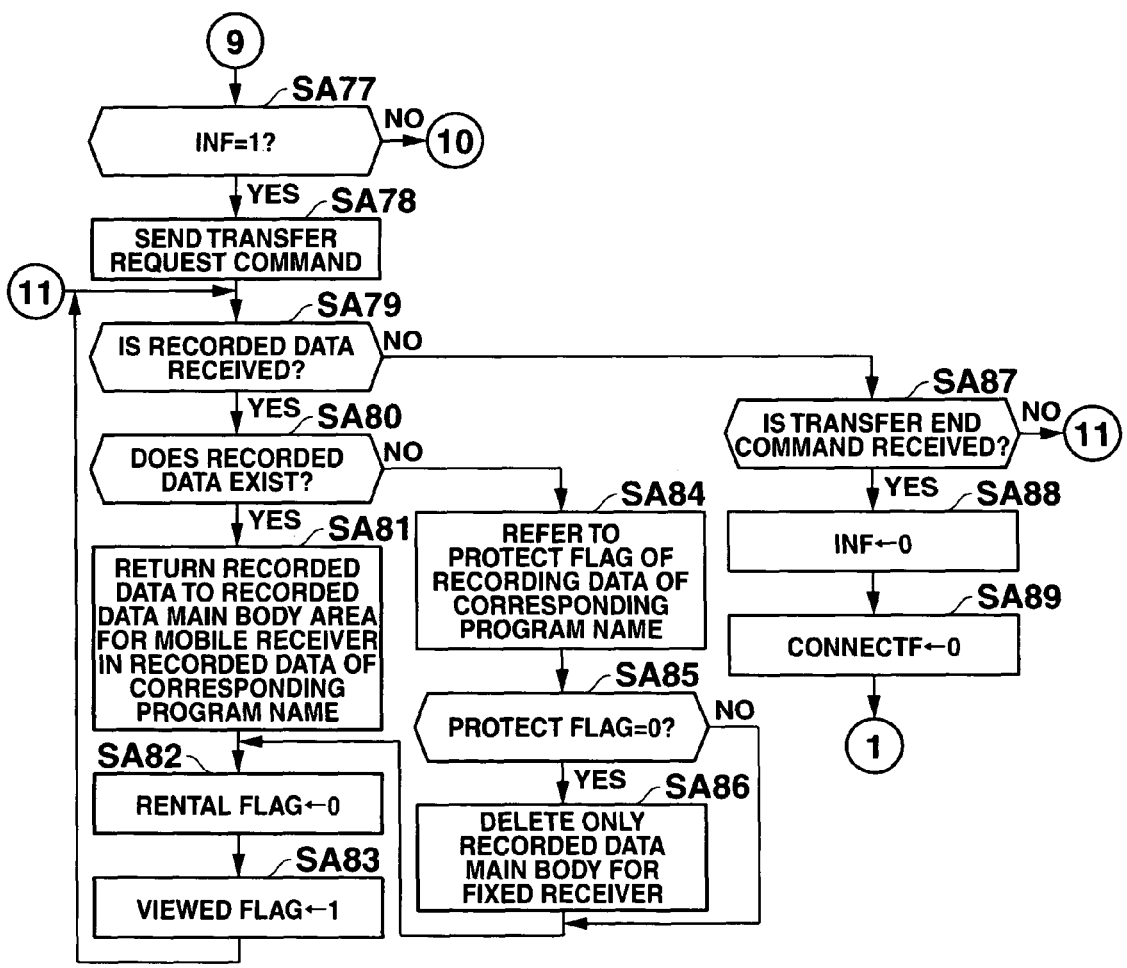
FIG. 10 is a flowchart showing an operation of the recording apparatus that follows the operation shown in FIG. 9.

In step SA62, if the flag OUTF is set to 0, the CPU 110 determines whether or not the flag INF is set to 1 in the flowchart shown in FIG. 10 (step SA77). If the flag INF is set to 1, a transfer request command is sent to the cellular phone device 200 (step SA78). Next, the CPU 110 determines whether or not recorded data is received from the cellular phone device 200 (step SA79). When the data is received, it is determined whether or not a recorded data main body exists in the received data (step SA80). If the recorded data main body exists, the CPU 110 returns it to an area of the recorded data main body for the mobile receiver in recorded data of a corresponding program name in the memory (step SA81). Next, the CPU 110 resets the rental flag to 0 (step SA82), and sets the viewed flag to 1 (step SA83). Then, the CPU 110 proceeds to step SA79 and waits for reception of another item of recorded data.

If no recorded data main body exists in the received image recorded data in step SA80, the image recorded data main body is deleted by a deleting operation by the user in the cellular phone device 200. In this case, the CPU 110 refers to the protect flag of the recorded data of a corresponding program name in the memory (step SA84). The CPU 110 determines whether or not the protect flag is set to 0 (step SA85). If the flag is set to 0, only the 13-segment recorded data main body for a fixed receiver of the same program name is deleted (step SA86). After the deletion or if the protect flag is set to 1 (deletion disabled), the CPU 110 resets the rental flag to 0 (step SA82), and sets the viewed flag to 1 (step SA83). Then, the CPU 110 proceeds to step SA79 and waits for reception of another item of recorded data.

In step SA79, if no recorded data is received, the CPU 110 determines whether or not a transfer end command is received (step SA87). When the transfer end command is received, the CPU 110 resets the flag INF to 0 (step SA88), and resets the flag CONNECTF to 0 in response to a line disconnection processing operation of the cellular phone device 200 (step SA89). Then, the CPU 110 proceeds to step SA3 shown in FIG. 4, and searches for on/off setting of another switch.

Figure 11:
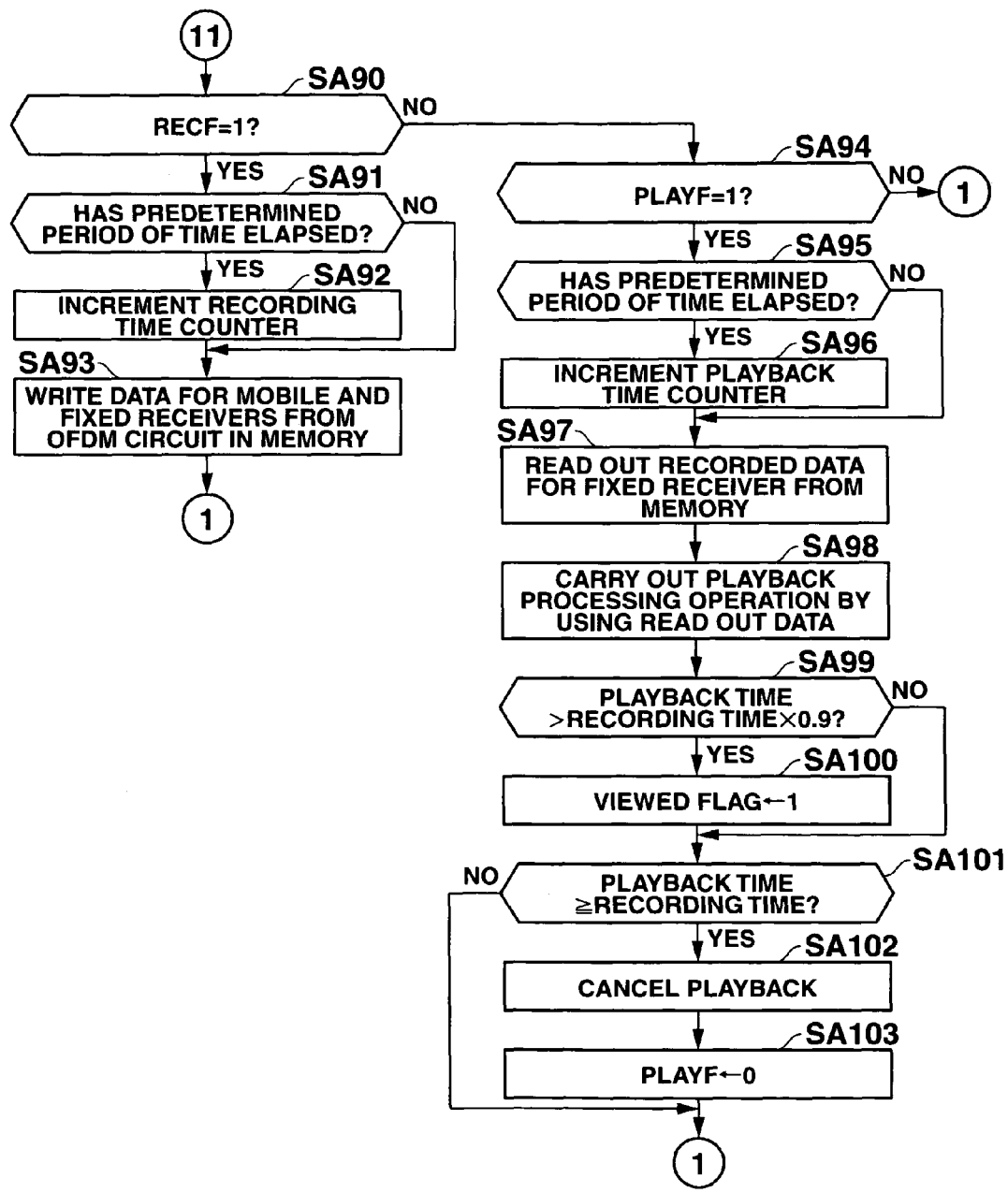
FIG. 11 is a flowchart showing an operation of the recording apparatus that follows the operation shown in FIG. 10.

If no transfer end command is received in step SA87, the CPU 110 determines whether or not the flag RECF is set to 1 (recording state) in the flowchart shown in FIG. 11 (step SA90). If the flag is set to 1, it is determined whether or not a predetermined period of time has elapsed (step SA91). When the predetermined period of time has elapsed, the CPU 110 increments a recording time counter (step SA92). After the recording time counter is incremented or if the predetermined period of time has not elapsed, the CPU 110 writes in the memory the items of program data for the fixed receiver and for the mobile receiver from the OFDM demodulator circuits 103 and 104 (step SA93). Then, the CPU 110 proceeds to step SA3 shown in FIG. 4, and searches for on/off setting of another switch.

If the flag RECF is set to 0 in step SA90, the CPU 110 determines whether or not the flag PLAYF is set to 1 (playback state) (step SA94). If the flag is set to 0, the CPU 110 proceeds to step SA3 shown in FIG. 4, and a search is made for on/off setting of another switch. If the flag is set to 1, it is determined whether or not a predetermined period of time has elapsed (step SA95). When the predetermined period of time has elapsed, the CPU 110 increments a playback time counter (step SA96). When fast-forward playback is operated, a value of the predetermined period of time changes in response to the speed ratio between a fast-forward playback speed and a normal playback speed. For example, if the fast-forward playback speed is 10 times of the normal playback speed, a predetermined period of time at the time of fast-forward playback is obtained as T/10 with respect to a predetermined period of time T at the time of normal playback.

After the playback time counter is incremented or if the predetermined period of time has not elapsed, the CPU 110 reads out recorded data for the fixed receiver from the memory (step SA97). Next, the CPU 110 performs a playback processing operation on the readout data (step SA98). That is, the CPU 110 sends the readout 13-segment recording main body for the fixed receiver to the 13-segment decoder circuit 105, and outputs the decoded recorded data main body from the input/output section 107 to the display section 112. The CPU 110 determines whether or not the playback time exceeds 90% of the recording time (step SA99). When the playback time exceeds 90% of the recording time, the viewed flag is set to 1 (step SA100). Next, the CPU 110 determines whether or not the playback time reaches the recording time (step SA101). When the playback time reaches the recording time, readout of the recorded data from the memory is canceled (step SA102). Next, the CPU 110 resets the flag PLAYF to 0 (step SA103). If the playback time does not reach the recording time in step SA101 or after the flag PLAYF is set to 0, the CPU 110 proceeds to step SA3 shown in FIG. 4 and searches for on/off setting of another switch.

Now, an operation of the cellular phone device 200 will be described.

Figure 13:
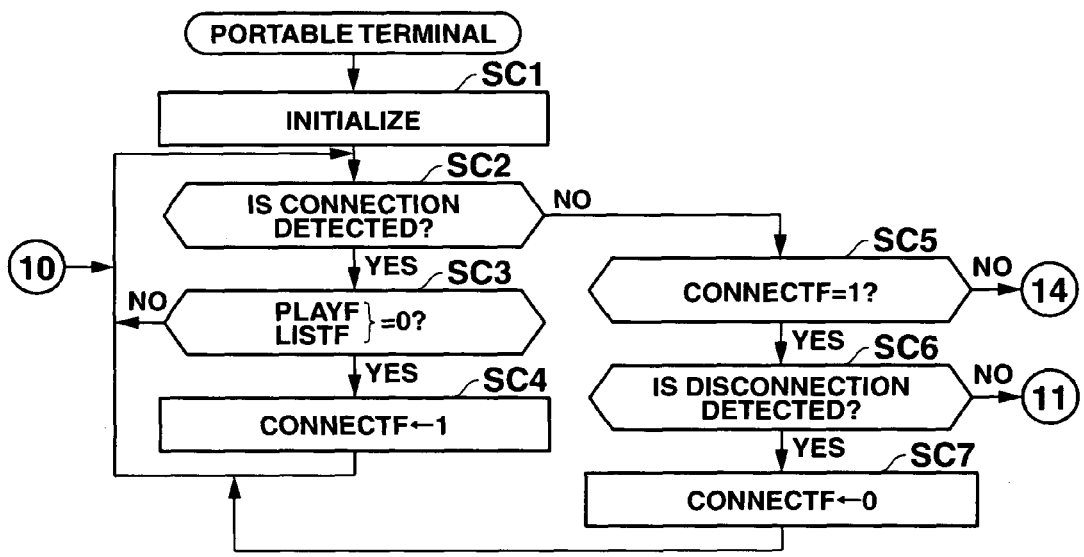
FIG. 13 is a flowchart showing an operation of the cellular phone device executed by the CPU shown in FIG. 2.

In FIG. 13, the CPU 205 executes a loop processing operation shown in FIGS. 13 to 17 in accordance with a communication state with the program recording apparatus 100, determination of each flag, and on/off switch setting after a predetermined initialization (step SC1). First, the CPU 205 determines whether or not Bluetooth wireless connection with the recording apparatus 100 is detected (step SC2). When the connection is detected, i.e., when there is a response from the recording apparatus 100 to an access for a line connection request, it is determined whether or not the flags PLAYF and LISTF are set to 0 (step SC3). If these two flags are set to 0 and if neither of a playback state and a list display state is set, the CPU 205 sets the flag CONNECTF to 1 (connection state) (step SC4).

In step SC2, if no connection with the program recording apparatus 100 is detected, the CPU 205 determines whether or not the flag CONNECTF is set to 1 (step SC5). If the flag CONNECTF is set to 1, it is determined whether or not disconnection (disconnection of Bluetooth wireless line to the program recording apparatus) is detected (step SC6). When disconnection is detected, the CPU 205 resets the flag CONNECTF to 0 (step SC7).

Figure 14:
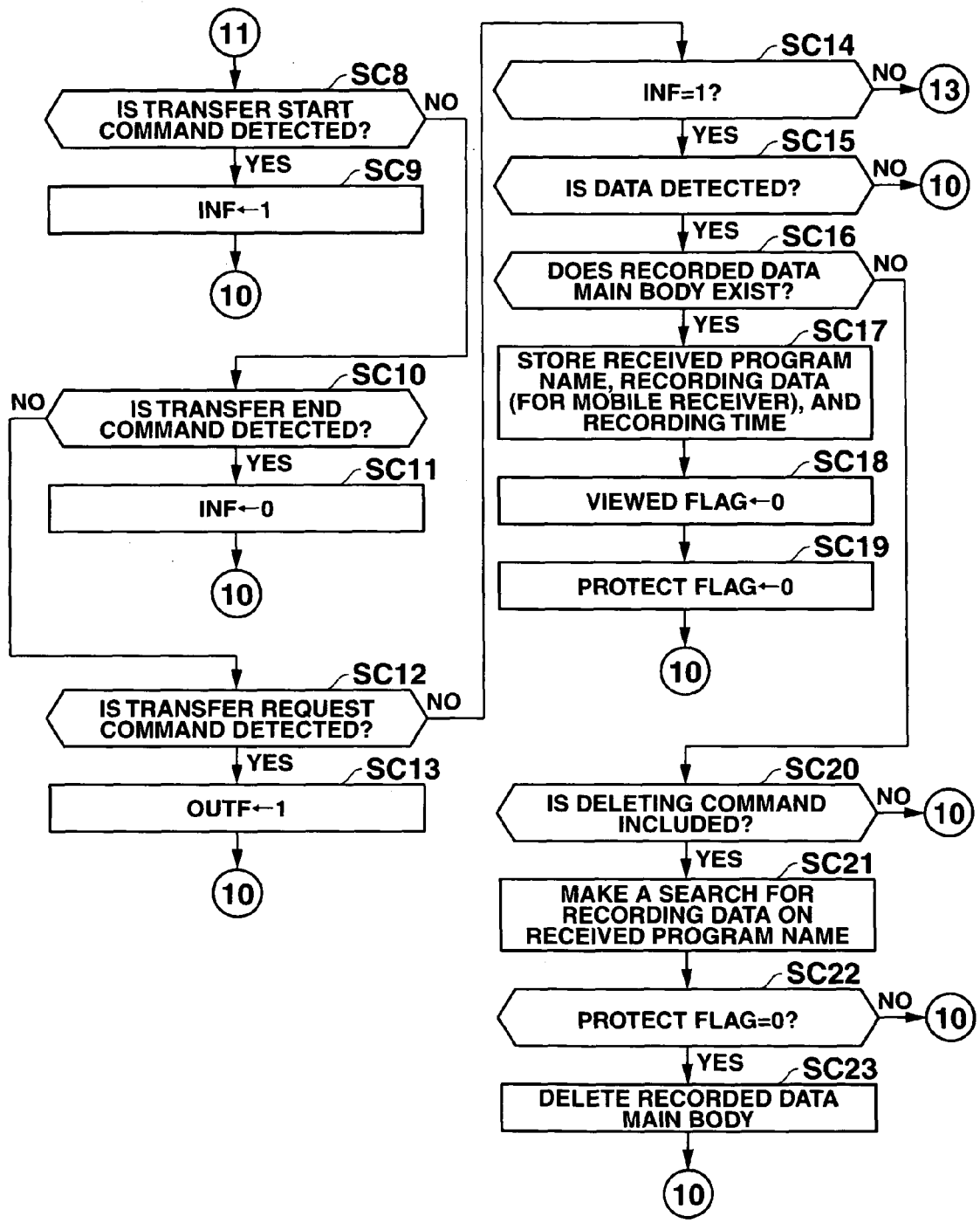
FIG. 14 is a flowchart showing an operation of the cellular phone device that follows the operation shown in FIG. 13.

If no disconnection is detected in step SA6, i.e., if communication with the program recording device 100 is in progress, the CPU 205 analyzes whether or not a command is received from the program recording apparatus 100 in the flowchart shown in FIG. 14. Next, the CPU 205 determines whether or not a transfer start command is received (step SC8). When the command is received, the flag INF is set to 1 (step SC9). If the transfer start command is not received, the CPU 205 determines whether or not a transfer end command is received (step SC10). When the command is received, the flag INF is reset to 0 (step SC11). If the transfer end command is not received, the CPU 205 determines whether or not a transfer request command is received (step SC12). When the command is received, the flag OUTF is set to 1 (step SC13). After these flag processing operations, the CPU 205 continues the loop processing operation.

If no command is received from the program recording apparatus 100 or after a command is received, the CPU 205 analyzes the contents of each flag. The CPU 205 determines whether or not the flag INF is set to 1 (step SC14). If the flag is set to 1, it is determined whether or not data is received from the program recording apparatus 100 (step SC15). When data has been received, the CPU 205 determines whether or not a recorded data main body exists in the received data (step SC16). If the recorded data main body exists, the CPU 205 stores in an external memory a received program name, a one-segment recorded data main body, and a recording time by using an external memory interface 215 (step SC17). Next, the CPU 205 resets the viewed flag to 0 (step SC18), and resets the protect flag to 0 (step SC19). After these flags have been reset or if no data has been received in step SC15 the CPU 205 continues the loop processing operation.

If no recording main body has been received in step SC16, the CPU 205 determines whether or not a deleting command is included in data of the received program name (step SC20). If the deleting command has been included, the CPU 205 searches for the recorded data of the received program name (step SC21). Then, the CPU 205 determines whether or not the protect flag of the recorded data is set to 0 (step SC22). If the flag is set to 0, the recorded data main body is deleted from the external memory (step SC23). After the deletion, or if the protect flag is set to 1 and the recording main body is not deleted from the external memory, or if the deleting command is not included in the received data, the CPU 205 continues the loop processing operation.

Figure 15:
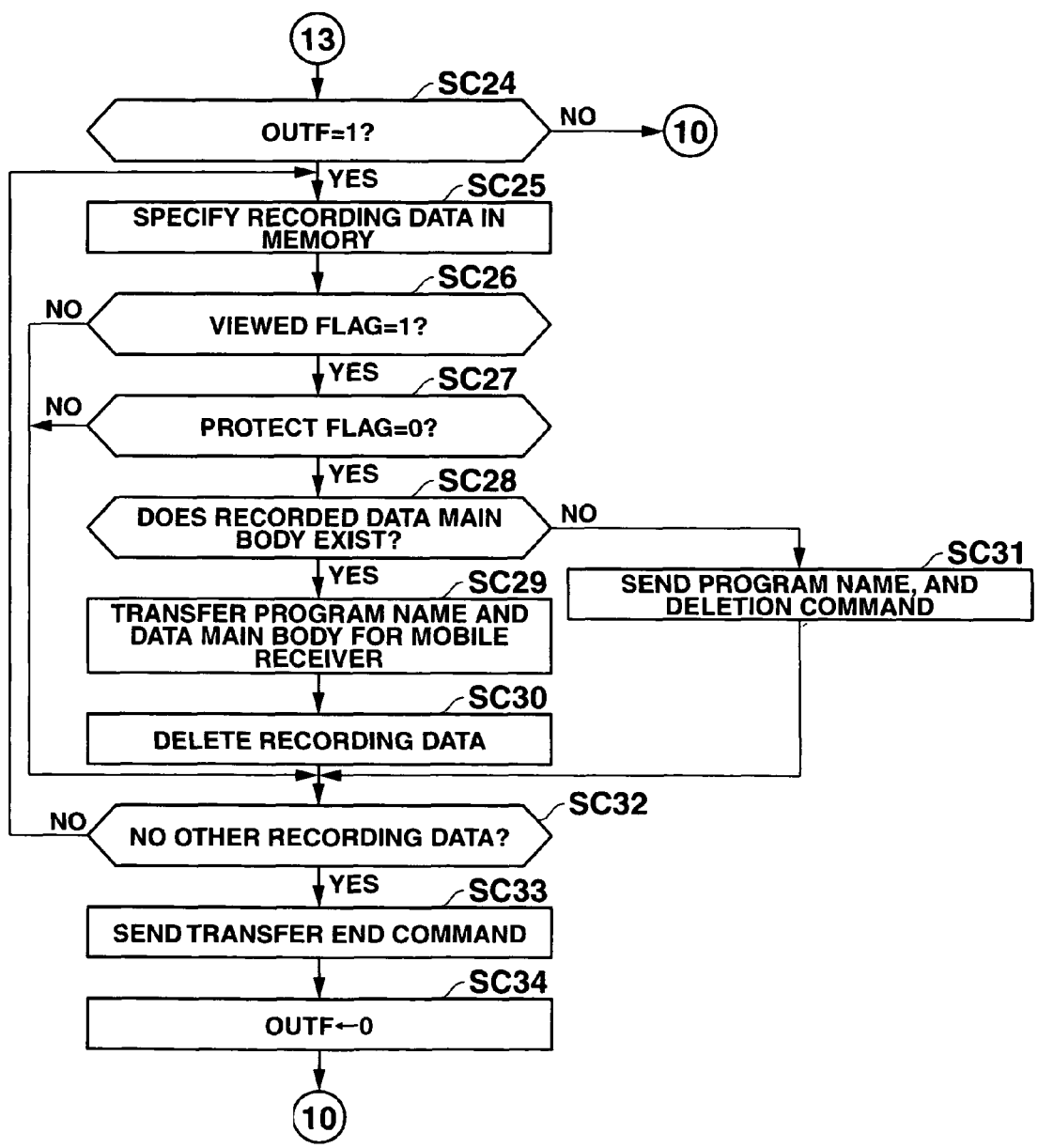
FIG. 15 is a flowchart showing an operation of the cellular phone device that follows the operation shown in FIG. 14.

If the flag INF is set to 0 in step SC14, the CPU 205 determines whether or not the flag OUTF is set to 1 in the flowchart shown in FIG. 15 (step SC24). If the flag is set to 1, the CPU specifies recorded data stored in the external memory (step SC25). The CPU 205 determines whether or not the viewed flag is set to 1 in the recorded data (step SC26). If the flag is set to 1, it is determined whether or not the protect flag is set to 0 (step SC27). If the flag is set to 0, the CPU 205 determines whether or not the recorded data main body exists in the recorded data (step SC28). If the recorded data main body exists, the CPU 205 transfers a program name and a one-segment image data main body to the program recording apparatus 100 (step SC29), and deletes the recorded data from the external memory (step SC30). That is, the CPU 205 transfers the viewed recorded data which is not prohibited from being deleted, from the cellular phone device 200 to the program recording apparatus 100. If no recorded data main body exists in the recorded data in step SC28, i.e., if the recorded data main body in the external memory has been already deleted by a deleting operation by the user, the CPU 205 sends a program name and a deleting command to the program recording apparatus 100 (step SC31).

If the viewed flag is set to 0 in step SC26, if the protect flag is set to 1 in step SC27, after recorded data has been deleted in step SC30, or after the program name and deleting command have been sent to the program recording apparatus 100 in step SC31, a search is made in another area of the external memory, and it is determined whether or not another item of recorded data exists (step SC32). If another item of image data exists, the CPU 205 proceeds to step SC25, specifies the recorded data, and repeats the above-described processing operation. If another item of recorded data does not exist, the CPU 205 sends a transfer end command to the program recording apparatus 100 (step SC33), and resets the flag OUTF to 0 (step SC34). After the flag has been reset or if the flag is set to 0 in step SC24, the CPU 205 continues the loop processing operation.

If the flag CONNECTF is set to 0 in step SC5 shown in FIG. 13, i.e., if the cellular phone device 200 is not connected to the program recording apparatus 100, the CPU 205 searches for the state of the switch section 214, and executes a switch processing operation according to an operation of each switch. The switch processing operation is identical to that in the program recording apparatus 100. Therefore, a duplicate description is omitted, and an outline of the operation will be described.

Figure 16:
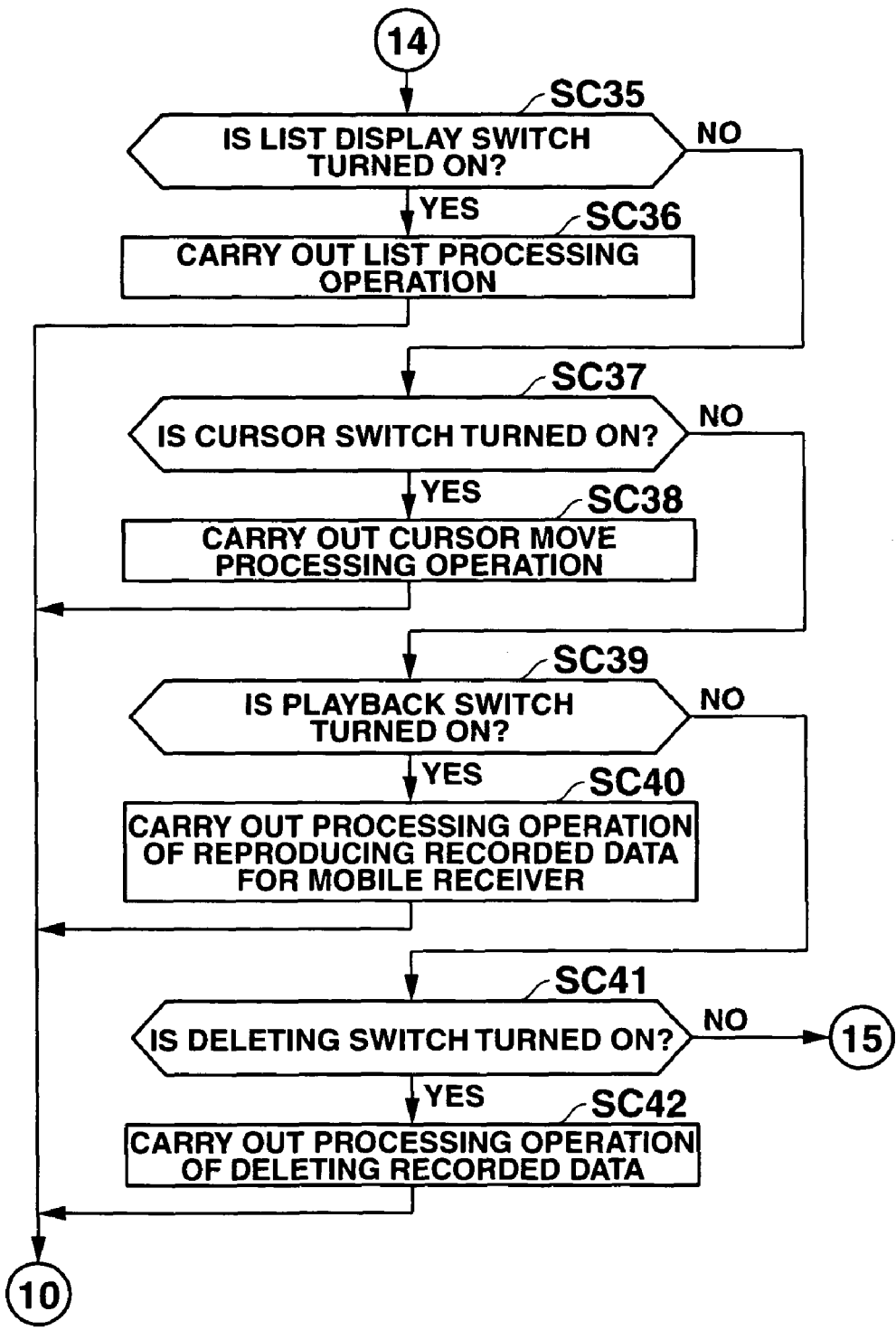
FIG. 16 is a flowchart showing an operation of the cellular phone device that follows the operation shown in FIG. 15.

In the flowchart shown in FIG. 16, the CPU 205 determines whether or not a list display switch has been turned on (step SC35). When the switch has been turned on, a list processing operation is executed (step SC36). If the list display switch has not been turned on, the CPU 205 determines whether or not a cursor switch has been turned on (step SC37). When the switch has been turned on, a cursor move processing operation is executed (step SC38). If the cursor switch has not been turned on, the CPU 205 determines whether or not a playback switch has been turned on (step SC39). When the switch has been turned on, a playback processing operation is executed (step SC40). If the playback switch has not been turned on, the CPU 205 determines whether or not a deleting switch has been turned on (step SC41). When the switch has been turned on, a processing operation of deleting recorded data is executed (step SC42).

Figure 17:
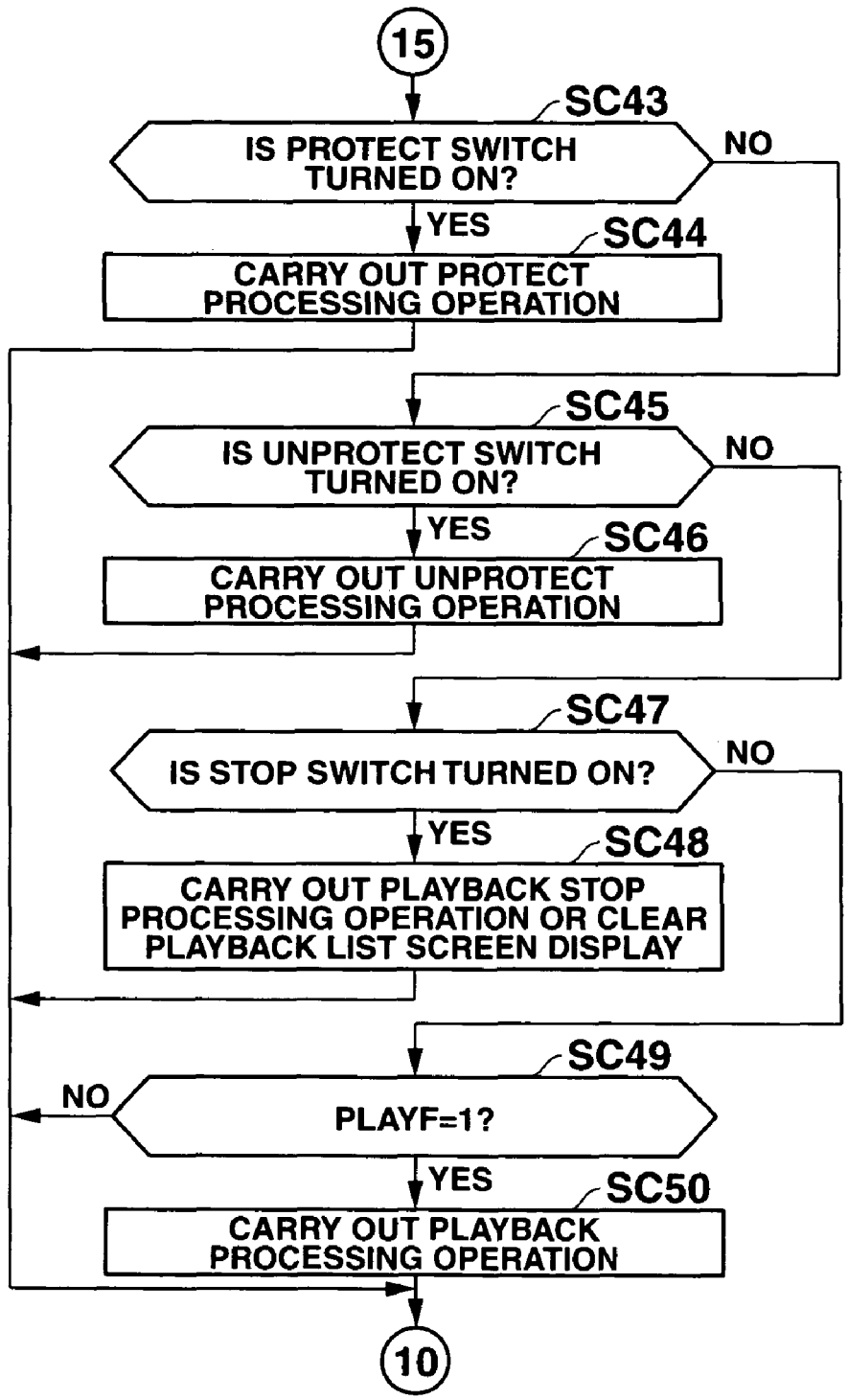
FIG. 17 is a flowchart showing an operation of the cellular phone device that follows the operation shown in FIG. 16.

If the deleting switch has not been turned on, the CPU 205 determines whether or not a protect switch has been turned on in the flowchart shown in FIG. 17 (step SC43). When the switch has been turned on, a protect processing operation is executed (step SC44). If the protect switch has not been turned on, the CPU 205 determines whether or not an unprotect switch has been turned on (step SC45). When the switch has been turned on, an unprotect processing is executed (step SC46). If the protect switch has not been turned on, the CPU 205 determines whether or not a stop switch has been turned on (step SC47). When the switch has been turned on, in the case of a playback state, a playback stop processing operation is executed. In the case of a list display state, a processing operation of clearing a playback list screen is executed (step SC48). If the stop switch has not been turned on, the CPU 205 determines whether or not the flag PLAYF is set to 1 (step SC49). If the flag is set to 1, a playback processing operation is executed (step SC50).

After each of the switch processing operations described above has been executed, if no switch has been turned on, the flag PLAYF is 0, and a playback stop state is established, or if playback of a recorded data main body is in progress, the CPU 205 proceeds to step SC2 shown in FIG. 13 and continues the loop processing operation.

As has been described above, according to the present embodiment, the recording apparatus 100 receives, with respect to an identical program, program data of high image quality 13-segment terrestrial digital broadcasting for a fixed receiver transmitted to the fixed receiver apparatus, and program data of low image quality one-segment terrestrial digital broadcasting for a mobile receiver transmitted to a cellular phone device 200. In addition, the recording apparatus 100 records the 13-segment program data for the fixed receiver apparatus and the one-segment program data for the cellular phone device. When the cellular phone device 200 is connected to the fixed receiver, the recorded one-segment program data is automatically transferred to the cellular phone device 200. Management information of the end of playback and deletion of a first program data whose program is identical to that of a transferred second program data is transmitted to the cellular phone device 200.

On the other hand, the cellular phone device 200 records the one-segment program data for the mobile receiver transferred from the recording apparatus 100, and transmits to the recording apparatus 100 the management information of the end of playback and deletion of the recorded program data.

Therefore, a problem associated with power consumption and limited recording capacity in the mobile terminal device is solved, and the received and recorded program data can be transferred to a mobile receiver apparatus without a need for a switching operation. Further, copyright protection by "Copy Once" can be observed.

In the first embodiment, the present invention has been described by taking a cellular phone device as an example of a mobile receiver apparatus. However, the configuration of a mobile receiver apparatus is not limited to a cellular phone device. For example, the mobile receiver apparatus can be formed by a PHS, a PDA, a car navigation system, a digital camera or video camera having a communication function, or the like.

In addition, in the first embodiment, the description has been given of the configuration of connecting a recording apparatus and a cellular phone device to each other by way of a Bluetooth wireless connection. However, there can be provided a configuration of establishing a connection by way of an infrared wireless connection; a configuration of directly connecting a recording apparatus and a cellular phone device to each other; or a configuration of establishing connection via a cable. For example, a cradle may be provided in the recording apparatus, and a cellular phone device may be mounted on the cradle so as to establish a direct connection. Alternatively, a cradle may be connected to the recording apparatus via a USB cable, and the cellular phone may be mounted on the cradle.

Other embodiments of the present invention will be described. The same portions as those of the first embodiment will be indicated in the same reference numerals and their detailed description will be omitted.

Figure 18:
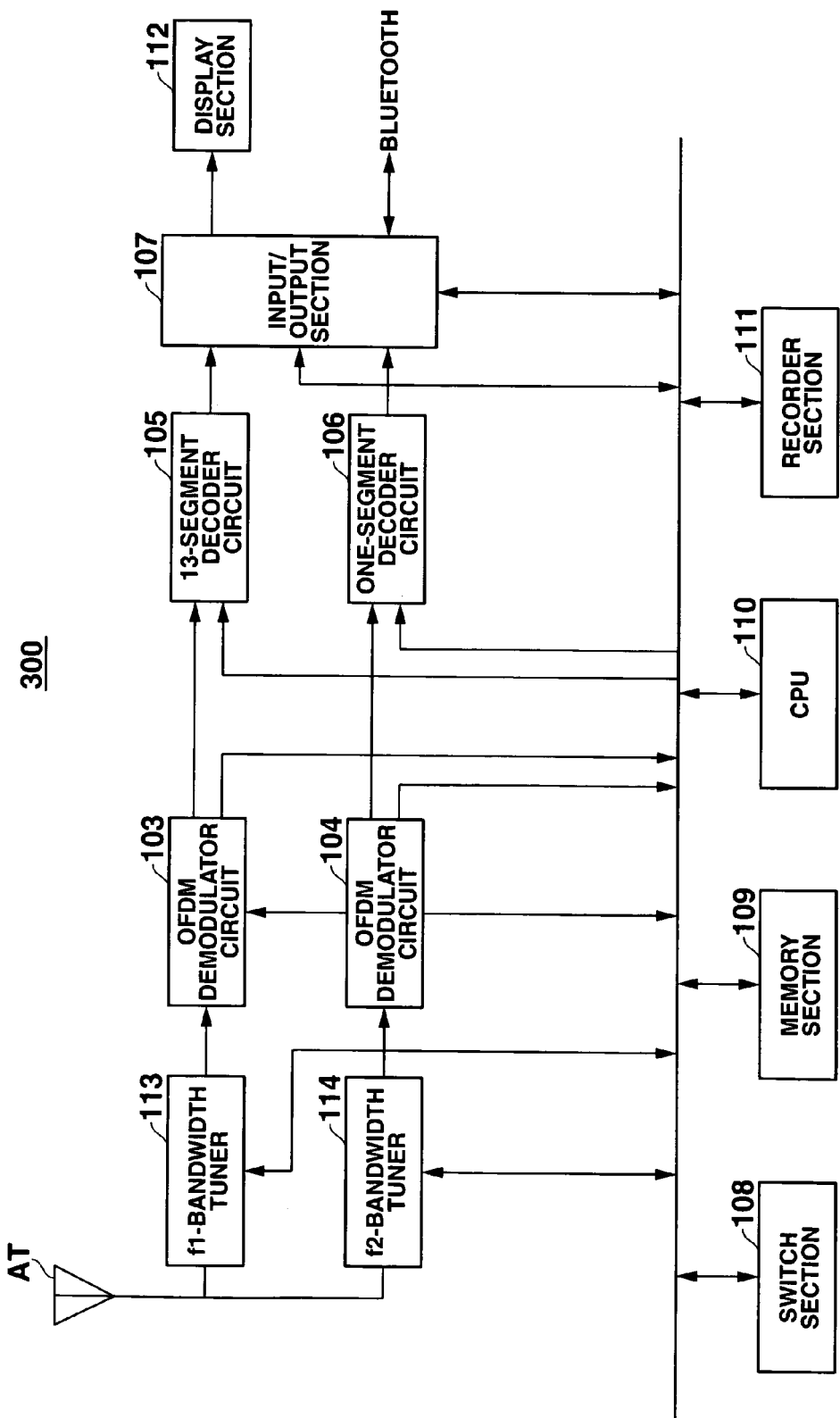
FIG. 18 is a block diagram depicting a configuration of a recording apparatus according to a second embodiment of the present invention.

FIG. 18 is a block diagram depicting a configuration of a recording apparatus 300 in a second embodiment. The recording apparatus 300 receives, via an antenna AT, radio waves of high image quality terrestrial digital broadcasting for a fixed receiver and low image quality terrestrial digital broadcasting for a mobile receiver. A tuner 113 for bandwidth f1 selects a received signal based on a set channel from the terrestrial digital broadcasting in bandwidth of frequency f1 obtained from the antenna AT. A tuner 114 for bandwidth f2 selects a received signal based on a set channel identical to that in bandwidth of frequency f1 from the terrestrial digital broadcasting in bandwidth of frequency f2 obtained from the antenna AT. An OFDM demodulator circuit 103 demodulates the received signal selected by the tuner 113. An OFDM demodulator circuit 104 demodulates the received signal selected by the tuner 114. Other constituent elements and functions are identical to those according to the first embodiment shown in FIG. 1. Thus, a duplicate description is omitted.

With respect to a configuration of recorded data obtained by recording terrestrial digital broadcasting as well, the present embodiment is identical to the first embodiment shown in FIG. 3 except that the high image quality recorded data main body for a fixed receiver is provided as data demodulated and decoded from the received signal in bandwidth of frequency f1, and the low image quality recorded data main body for a mobile receiver is provided as data demodulated and decoded from the received signal in bandwidth of frequency f2. Thus, a figure and a description are omitted.

Further, with respect to an operation of the program recording apparatus 300 shown in FIG. 18 and an operation of a mobile receiver which is not shown, such as a cellular phone device, a PDA, a car navigation system or the like, the present embodiment is identical to the flowchart of the program recording apparatus shown in FIGS. 4 to 12 and the flowchart of the mobile terminal shown in FIGS. 13 to 17 except that the high image quality recorded data main body for a fixed receiver is provided as data demodulated and decoded from the received signal in bandwidth of frequency f1, and the low image quality recorded data main body for a mobile recorder is provided as data demodulated and decoded from the received signal in bandwidth of frequency f2. Thus, a figure and a description are omitted.

Now, a third embodiment of the present invention will be described. The third embodiment is provided as a modification of the first embodiment or the second embodiment.

FIG. 19 is a block diagram depicting a configuration of a recording apparatus 301 in the third embodiment. The program recording apparatus 301 receives, via an antenna AT, radio waves of high image quality terrestrial digital broadcasting for a fixed receiver and low image quality terrestrial digital broadcasting for a mobile receiver. The program recording apparatus 301 selects, in a multi-tuner 115, received signals of two systems of terrestrial digital broadcasting for a fixed receiver and for a mobile receiver based on a set channel. If the terrestrial digital broadcasting is composed of 13 segments as in the first embodiment, a 12-segment received signal and a one-segment received signal are separated from each other in the multi-tuner 115, and the separated signals are output to the OFDM demodulator circuits 103 and 104, respectively. On the other hand, if terrestrial digital broadcasting is composed of an f1 bandwidth and an f2 bandwidth as in the second embodiment, a frequency separation circuit is required for the multi-tuner 115. Other constituent elements and operation of the program recording apparatus are substantially identical to those according to the first embodiment.

Even if terrestrial digital broadcasting is composed of 13 segments or even if the terrestrial digital broadcasting is composed of the f1 bandwidth and the f2 bandwidth, the received signal for the fixed receiver is output to the OFDM demodulator circuit 103, and the received signal for the mobile receiver is output to the OFDM demodulator circuit 104. Therefore, the operation of the program recording apparatus is substantially identical to that according to the first embodiment. Figures and duplicate description are not repeated here.

The foregoing embodiments and accompanying drawings are provided merely to indicate the principle of the present invention. Other various embodiments or modifications that can be readily conceived by one skilled in the art from these embodiments and drawings, without departing from the spirit and scope of the present invention, belong to the principle of the present invention.

What is claimed is:

1. A recording apparatus comprising:
    a demodulator which receives, with respect to a single program, high image quality first digital broadcasting data for a fixed receiver apparatus and low image quality second digital broadcasting data for a mobile receiver apparatus, and which demodulates the first digital broadcasting data and the second digital broadcasting data to obtain first program data for the fixed receiver apparatus and second program data for the mobile receiver apparatus;
    a recording controller which records, in a recording medium, the first program data and the second program data obtained by the demodulator;
    a connection detector which detects whether the mobile receiver apparatus is connected to the recording apparatus;
    a communication unit which, when a connection of the mobile receiver apparatus is detected by the connection detector, transfers the second program data recorded in the recording medium to the mobile receiver apparatus;
    a playback unit which, when a specifying instruction for specifying the first program data recorded in the recording medium and a playback instruction for reproducing the first program data recorded in the recording medium are input, reproduces the first program data specified by the specifying instruction; and
    a playback end detector which detects an end of playback of the first program data;
    wherein when the playback end detector detects the end of playback of the first program data, the communication unit transmits at least one of (i) a request to the mobile receiver apparatus to transfer the second program data back to the recording apparatus, and (ii) an instruction to delete the second program data on the mobile receiver apparatus.

2. The recording apparatus according to claim 1, wherein, when first program data is deleted from the recording medium by the recording controller, the communication unit transmits, to the mobile receiver apparatus, an instruction for deleting the second program data and, when a notification of deleting the second program data is received from the mobile receiver apparatus by the communication unit, the recording controller deletes the first program data from the recording medium.

3. The recording apparatus according to claim 2, wherein, when a deletion disabled instruction with respect to the first program data recorded in the recording medium is input, the recording controller does not delete the first program data from the recording medium even when the notification of deleting the second program data is received from the mobile receiver apparatus.

4. The recording apparatus according to claim 1, further comprising:
    a transfer management unit which, when the second program data recorded in the recording medium is transferred to the mobile receiver apparatus, adds to the first program data information indicating that the second program data is being transferred.

5. The recording apparatus according to claim 1, wherein the first digital broadcasting data comprises data of a plurality of segments transmitted by dividing a predetermined frequency bandwidth into 13 segments, and the second digital broadcasting data comprises one segment.

6. The recording apparatus according to claim 1, wherein the first digital broadcasting data and the second digital broadcasting data comprise data in different frequency bandwidths from each other.

7. A mobile receiver apparatus comprising:
    a communication unit which communicates with a recording apparatus which receives and records, with respect to a single program, high image quality first program data for a fixed receiver apparatus and low image quality second program data for the mobile receiver apparatus, and which when a connection is established to the recording apparatus receives the second program data from the recording apparatus;

a recording controller which records in a recording medium the second program data received by the communication unit; and a playback controller which, when a playback instruction is input, reproduces the second program data recorded in the recording medium;

a playback end detector which detects an end of playback of the second program data;

wherein when the playback end detector detects the end of playback of the second program data, at least one of (i) the communication unit transfers the second program data back to the recording apparatus, (ii) the communication unit issues a deletion instruction to the recording apparatus to delete the first program data, and (iii) the recording controller deletes the second program data from the recording medium.

8. The mobile receiver apparatus according to claim 7, wherein, when a deleting instruction is input in response to a manual operation or when a deleting instruction is received from the recording apparatus by the communication unit, the recording controller deletes the second program data according to the deleting instruction from the recording medium, and, when the second program data is deleted by the recording controller in response to the input deleting instruction, the communication unit transmits a notification of deleting the second program data to the recording apparatus.

9. The mobile receiver apparatus according to claim 8, wherein, when an instruction for disabling deletion to the second program data recorded in the recording medium is input in response to a manual operation, when a deleting instruction is input to the second program data in response to an operation, or even when the deleting instruction is received from the recording apparatus by the communication unit, the recording controller does not delete the second program data.

10. A data management method for performing communication between a recording apparatus and a mobile receiver apparatus, and managing program data of digital broadcasting, wherein:

the recording apparatus receives, with respect to a single program, high image quality first digital broadcasting data for a fixed receiver apparatus and low image quality second digital broadcasting data for a mobile receiver apparatus;

the recording apparatus records first program data corresponding to the high image quality first digital broadcasting data for the fixed receiver apparatus and second program data corresponding to the low image quality second digital broadcasting data for the mobile receiver apparatus;

when the mobile receiver apparatus is connected to the recording apparatus, the recording apparatus transfers the recorded second program data to the mobile receiver apparatus;

the recording apparatus transmits, to the mobile receiver apparatus, first management information indicating at least one of an end of playback and deletion of the first program data;

the mobile receiver apparatus records the second program data transferred from the recording apparatus, and transmits, to the recording apparatus, second management information indicating at least one of an end of playback and deletion of the second program data; and the mobile receiver apparatus at least one of (i) transfers the second program data back to the recording apparatus, and (ii) deletes the second program data, in accordance with the received first management information.

* * * * *